US012618418B1

(12) United States Patent
Morozov

(10) Patent No.: US 12,618,418 B1
(45) Date of Patent: May 5, 2026

(54) GAS PROPULSION THRUST DEVICE

(71) Applicant: Igor Morozov, Odessa (UA)

(72) Inventor: Igor Morozov, Odessa (UA)

(*) Notice: Subject to any disclaimer, the term of this patent is extended or adjusted under 35 U.S.C. 154(b) by 0 days.

(21) Appl. No.: 19/094,836

(22) Filed: Mar. 29, 2025

(51) Int. Cl.
| | |
|---|---|
| *F04D 33/00* | (2006.01) |
| *B64C 39/00* | (2023.01) |
| *B64D 27/00* | (2006.01) |
| *F04B 31/00* | (2006.01) |
| *F04D 23/00* | (2006.01) |
| *F04D 25/06* | (2006.01) |
| *F04D 29/44* | (2006.01) |
| *F02K 7/00* | (2006.01) |

(52) U.S. Cl.
CPC ............. *F04D 33/00* (2013.01); *B64C 39/00* (2013.01); *B64D 27/00* (2013.01); *F04B 31/00* (2013.01); *F04D 23/006* (2013.01); *F04D 25/066* (2013.01); *F04D 29/441* (2013.01); *F02K 7/00* (2013.01)

(58) Field of Classification Search
CPC ... B64G 1/26; F02K 7/02; F04D 33/00; F04D 25/066; F04D 23/006; F04D 29/4213; F04D 29/441; B64C 2230/18; F04B 43/046; F04B 45/047; F04B 19/006; F04B 31/00
USPC ................................................ 417/416–418
See application file for complete search history.

(56) References Cited

U.S. PATENT DOCUMENTS

| | | | | |
|---|---|---|---|---|
| 163,860 | A * | 6/1875 | Fishbaugh | ............... F04B 19/14 |
| | | | | 417/320 |
| 2,707,074 | A * | 4/1955 | Tussey | ................ F04B 43/0054 |
| | | | | 137/859 |

| | | | | |
|---|---|---|---|---|
| 3,422,765 | A * | 1/1969 | Schoch | ................. F04B 17/044 |
| | | | | 417/418 |
| 3,842,440 | A * | 10/1974 | Karlson | .............. A61M 60/876 |
| | | | | 623/3.19 |
| 5,107,920 | A * | 4/1992 | Scotti | ..................... B64D 13/00 |
| | | | | 165/104.34 |
| 5,509,792 | A * | 4/1996 | Sullivan | ................ F04B 17/048 |
| | | | | 92/162 P |
| 2004/0025581 | A1 * | 2/2004 | Miller | ..................... G01L 19/12 |
| | | | | 73/146 |
| 2005/0112001 | A1 * | 5/2005 | Bahnen | ................. F04B 35/045 |
| | | | | 417/418 |

(Continued)

*Primary Examiner* — Devon C Kramer
*Assistant Examiner* — Marc Amar
(74) *Attorney, Agent, or Firm* — Boris Leschinsky

(57) ABSTRACT

The gas propulsion thrust device comprises a cone-shaped propulsion element with a rigid concave internal surface and a second convex external surface. The propulsion element is submerged in gas and aligned with a high-frequency linear actuator, which causes its reciprocal motion along the longitudinal axis, generating thrust. The device includes a thrust chamber that supports the actuator and surrounds the propulsion element, maintaining a consistent gap between the propulsion element and the chamber to direct gas from the second side to the first side. The chamber tapers around the propulsion element, and a gas directing cap is configured to direct gas around the second side towards the first side. Propulsion element is rigid and its shape remains unchanged during the operation. The reciprocal motion creates a gas pressure differential across the propulsion element, generating thrust by propelling gas away from the propulsion element in the opposite direction of propulsion. The device offers efficient and controlled thrust generation.

8 Claims, 21 Drawing Sheets

(56)     References Cited

U.S. PATENT DOCUMENTS

| 2008/0095647 | A1 * | 4/2008 | Grundl | ................. | F04B 17/042 |
| | | | | | 417/417 |
| 2018/0038363 | A1 * | 2/2018 | Trethewey | ............. | F04B 43/04 |

* cited by examiner

A-A

1c

A-A

1c

1d

A          A

A-A

1d

A-A

GAS PROPULSION THRUST DEVICE

CROSS-REFERENCE DATA

This US Patent Application claims a foreign priority date benefit to my Ukrainian Patent Application No. a202405732 filed on 4 Jan. 2024, entitled "GAS PROPULSION DEVICE". This application is incorporated herein by reference in its entirety.

BACKGROUND

Without limiting the scope of the invention, its background is described in connection with gas propulsion devices. More particularly, the invention describes a device configured to convert the reciprocal motion of an actuator into a gas propulsion oriented in the desired direction. The device of the invention may be used as a main or a secondary thrust engine for a flight apparatus, for example, an airplane, an air taxi, a rocket, a helicopter, a hovercraft, a powered parachute, an air balloon, as well as other manned and unmanned aircraft devices.

A rotating propeller is the main thrust device used in many aircraft devices flying with speeds not exceeding the speed of sound. These devices include drones, quadcopters, automated air taxis, and other devices configured for take-off and landing in highly populated areas such as cities. Close encounters with people nearby creates a risk of injury to people from the rotation of one or more propellers of such a flying device. A recent trend in aerial taxi systems increased safety risks from high-speed, fast-rotating blades used in vertical takeoff and landing. These rotor assemblies, close to passengers and urban infrastructure, pose hazards, especially in dense city settings.

The need exists therefore for a simpler and safer engine device that can be configured to provide both the vertical lifting power as well as the horizontal thrust for an aircraft used in highly populated areas.

SUMMARY

Accordingly, it is an object of the present invention to overcome these and other drawbacks of the prior art by providing a novel gas propulsion device configured to provide a superior propulsion force as compared to prior art.

It is another object of the present invention to provide a gas propulsion thrust device with increased efficiency of converting reciprocal movement energy to propagation forces moving the device through the gas medium.

It is a further object of the present invention to provide a novel gas propulsion thrust device with gas flow dynamics characterized by improved stability throughout various components of the device.

The present invention aims to create a gas propulsion device that enhances thrust and stabilizes the direction of the gas flow. In some embodiments, it further allows for additional thrust increase by injecting inert gases or their mixtures to enable operation in limited or standard atmospheric conditions and using a combustion chamber to ensure safety and emergency operation.

A gas propulsion device comprises a cone-shaped gas propulsion element with a circular outer edge, featuring a concave inner surface facing its first side and a convex outer surface facing its second side, opposite to the first side. A high-frequency actuator is also provided and oriented along the propulsion thrust direction. It is operatively connected to the gas propulsion element to cause its reciprocating motion along the thrust direction with sufficient speed and amplitude to form a high-pressure gas zone on its first side and a low-pressure gas zone on its second side thereof. This, in turn, creates gas flow from the gas propulsion element in a direction opposite to the thrust direction. The gas propulsion element is placed in a thrust chamber with a gap between its outer edge and the inner surface of the thrust chamber. A directional cap may be placed on the second side of the gas propulsion element to redirect the gas flow from the second side to the first side.

Further embodiments focus on increasing thrust by optimizing the thrust chamber design, including a narrowed upper part and conical sections, applying magnetic levitation to eliminate mechanical losses, and using high-frequency linear drives such as piezoelectric stacks, magnetostrictive transducers, ultrasonic resonators, and horns. Additionally, embodiments are described which are configured for injecting inert gases, liquid mists, and other mixtures so as to increase pressure and cavitation effects. Other embodiments integrate the propulsion element with a combustion chamber, which provides additional thrust and expands the functional capabilities of the device. The present invention enhances efficiency, stabilizes the flow direction, and allows the device to operate in various modes including at supersonic speeds.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 7 shows a front view of the thrust chamber 3 with a narrowed upper part 3a.

DETAILED DESCRIPTION OF PREFERRED EMBODIMENTS OF THE INVENTION

Figures 1, 2:
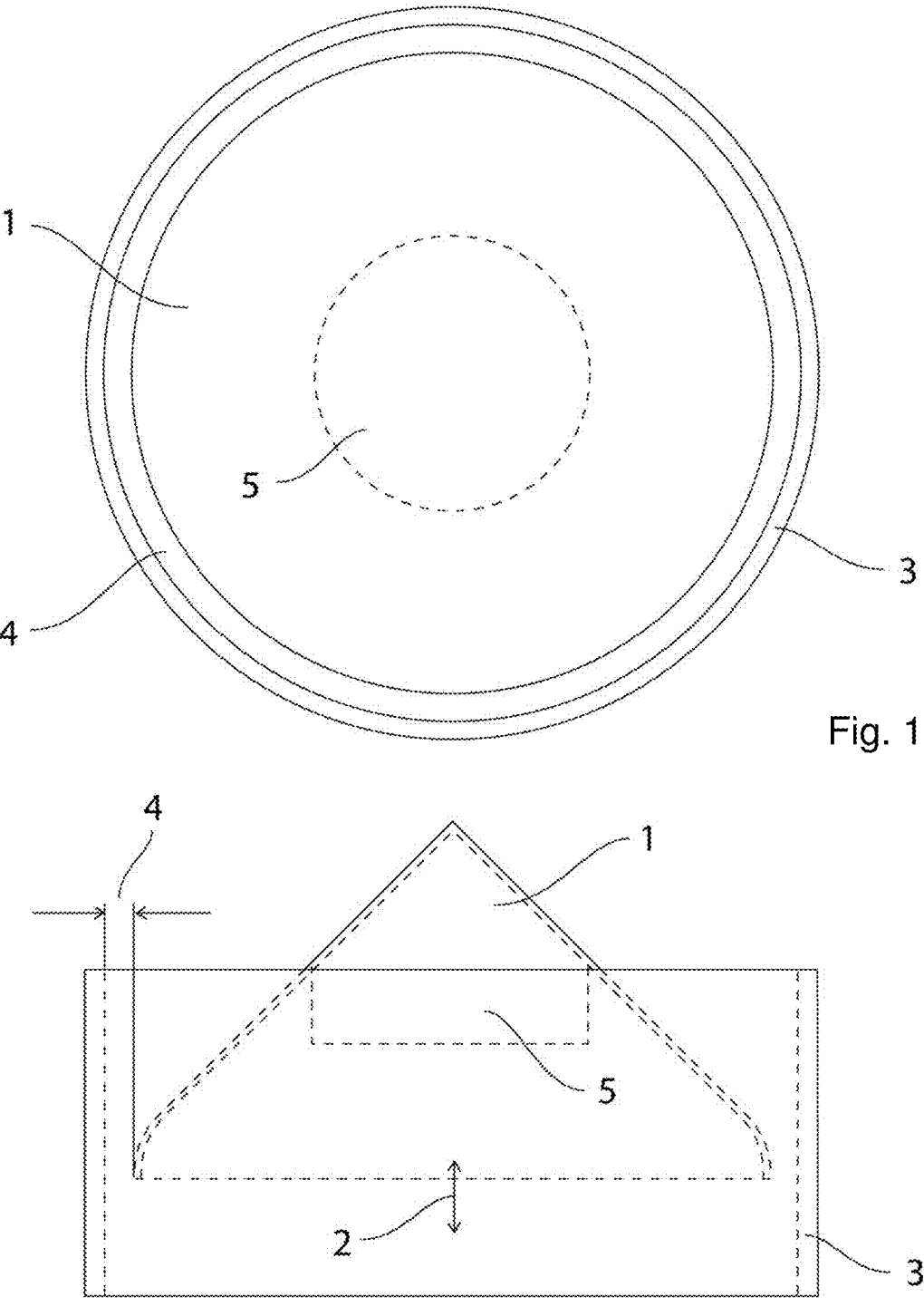
FIGS. 1 and 2 show top and front views of the propulsion element 1 positioned inside the thrust chamber 3 with a gap 4, high-frequency actuator 5, and vibration direction along the line 2.

The following description sets forth various examples along with specific details to provide a thorough understanding of claimed subject matter. It will be understood by those skilled in the art, however, that claimed subject matter may be practiced without one or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The term "gas" is used herein to describe any moving gaseous medium surrounding the device of the present invention, including a gas, a mixture of gases, or a mixture or mist of gases and fluids. While the description below refers to the device of the invention moving through air or another gas, this is done for illustrative purposes only, as the invention is not limited in this regard.

In broad terms, a gas propulsion thrust device of at least some embodiments may include:

a cone-shaped propulsion element having a rigid concave internal surface defining an outer edge and facing a first side thereof. The concave internal surface may be axisymmetric about a longitudinal axis aligned along the direction of propulsion thrust. The propulsion element may have a second convex external surface adjacent to the concave internal surface and the outer edge. The external surface may face the second side, opposite the first side of the propulsion element. The propulsion element may be submerged in and surrounded by gas medium;

a high-frequency linear actuator aligned along a direction of propulsion thrust. The high-frequency linear actuator may be operatively cooperating with the propulsion element to cause reciprocal motion thereof along the longitudinal axis and along the direction of propulsion thrust;

a thrust chamber supporting the high-frequency actuator fixedly attached thereto. In embodiments, the thrust chamber may be positioned to surround at least the outer edge of the propulsion element. Importantly, the thrust chamber may be spaced away from the outer edge of the propulsion element by a gap. The gap may be selected to direct gas from the second side to the first side of the propulsion element.

Furthermore, the thrust chamber may be shaped to maintain the same gap throughout a range of reciprocal motion of the propulsion element within the thrust chamber. In other embodiments, the thrust chamber may be shaped to narrow and taper around the propulsion element at the second side thereof;

a gas directing cone-shaped cap mounted on the thrust chamber adjacent and outside the second side of the cone-shaped propulsion element. The gas cap may be configured to direct gas around the second side and toward the first side of the propulsion element.

The propulsion element is sufficiently rigid. In this case, the reciprocal motion of the propulsion element within the thrust chamber is caused by the high-frequency linear actuator and is conducted without altering the shape of the propulsion element. The device is operated so that the reciprocal motion of the propulsion element forms a high gas pressure zone on the first side of the propulsion element and a low gas pressure zone on the second side thereof. This, in turn, generates a gas pressure differential across the propulsion element and along the direction of propulsion thrust. The gas pressure differential causes the propulsion of gas away from the propulsion element and in a direction opposite the direction of propulsion thrust, which moves the entire device in the direction of propulsion thrust.

Reciprocal motion of the propulsion element may be conducted at the same speed in each direction, although the invention is not limited in this regard.

In other embodiments, the gas propulsion element may feature electromagnetic coils, the magnetic levitation high-frequency linear actuator may include permanent magnets operatively cooperating with the electromagnetic coils to form a magnetic levitation system. Additional guiding magnets may be used to stabilize magnetic levitation of the propulsion element. The magnetic levitation system may be configured to control the position of the propulsion element via magnetic levitation and cause reciprocal motion of the propulsion element along the direction of propulsion thrust.

In further yet embodiments, a combustion chamber may be provided and integrated with the thrust chamber to enhance thrust through controlled combustion, or the thrust chamber may itself serve as the combustion chamber. The combustion chamber may be configured to receive a combustible fuel mixture from a fuel mixture supply system. The combustion chamber may further include an ignition system configured to ignite the combustible fuel mixture.

FIGS. 1 and 2 illustrate a cone-shaped gas propulsion thrust device comprising a gas propulsion element 1 in the form of a hollow cone with a generally concave first side and a generally convex second side. The propulsion element 1 is positioned within a cylindrical thrust chamber 3 in such a manner that a gap 4 is formed and maintained between its outer edge and the inner surface of the cylindrical thrust chamber. This gap 4 is designed to facilitate and direct the movement of gas from the second side of the propulsion element to its first side.

A high-frequency linear actuator 5 is operatively coupled to the propulsion element 1. It is generally configured to cause reciprocal motion along the longitudinal axis of the device, as indicated by arrow 2. During the downward motion, a high-pressure zone forms on the first side of the propulsion element 1, while during the upward motion, a low-pressure zone develops on the second side. This pressure differential generates a propulsion force along the direction of propulsion thrust of the device, directed toward the first side of the propulsion element.

The cylindrical thrust chamber 3 is formed to direct gas flow longitudinally and without excessive lateral dispersion, thereby enhancing gas circulation and device efficiency. This design enables the device to maintain stable thrust in both subsonic and supersonic regimes, facilitating more efficient formation of a directed gas stream.

During reciprocal motion, the propulsion element 1 oscillates upward and downward with a defined frequency and amplitude. Although its motion is oscillatory, at any given moment, it possesses a specific linear velocity. This velocity is directly proportional to both the amplitude and frequency of oscillation: an increase in frequency with a fixed amplitude or an increase in amplitude with a constant frequency results in a corresponding increase in velocity.

While modern technology allows for achieving oscillation frequencies up to 200 kHz, the present invention is not limited to this range. The operational frequency spectrum can start from about 500 Hz and exceed 200 kHz as technological advancements progress.

In the subsonic mode of operation, where the gas exhaust velocity from the cylindrical thrust chamber is below 340 m/s, the oscillation amplitudes of the gas propulsion element 1 may typically range between about 0.005 mm and about 20 mm, with the frequency being adjusted according to the required efficiency. As frequency increases and amplitude decreases, localized gas compression zones, pressure surges, and high-velocity flows may develop, with certain regions reaching speeds of up to 340 m/s.

In a supersonic mode of operation, where the gas exhaust velocity exceeds 340 m/s, the oscillation amplitudes may generally fall within the range of about 0.05-5 mm, while the required frequency may be determined by the selected amplitude—the smaller the amplitude, the higher the frequency must be to maintain the desired operational regime. Under these conditions, resonance zones may be formed, characterized by alternating high-pressure regions, supersonic shock waves, and high-frequency acoustic oscillations, all of which may positively influence the gas flow dynamics.

Figures 3, 4:
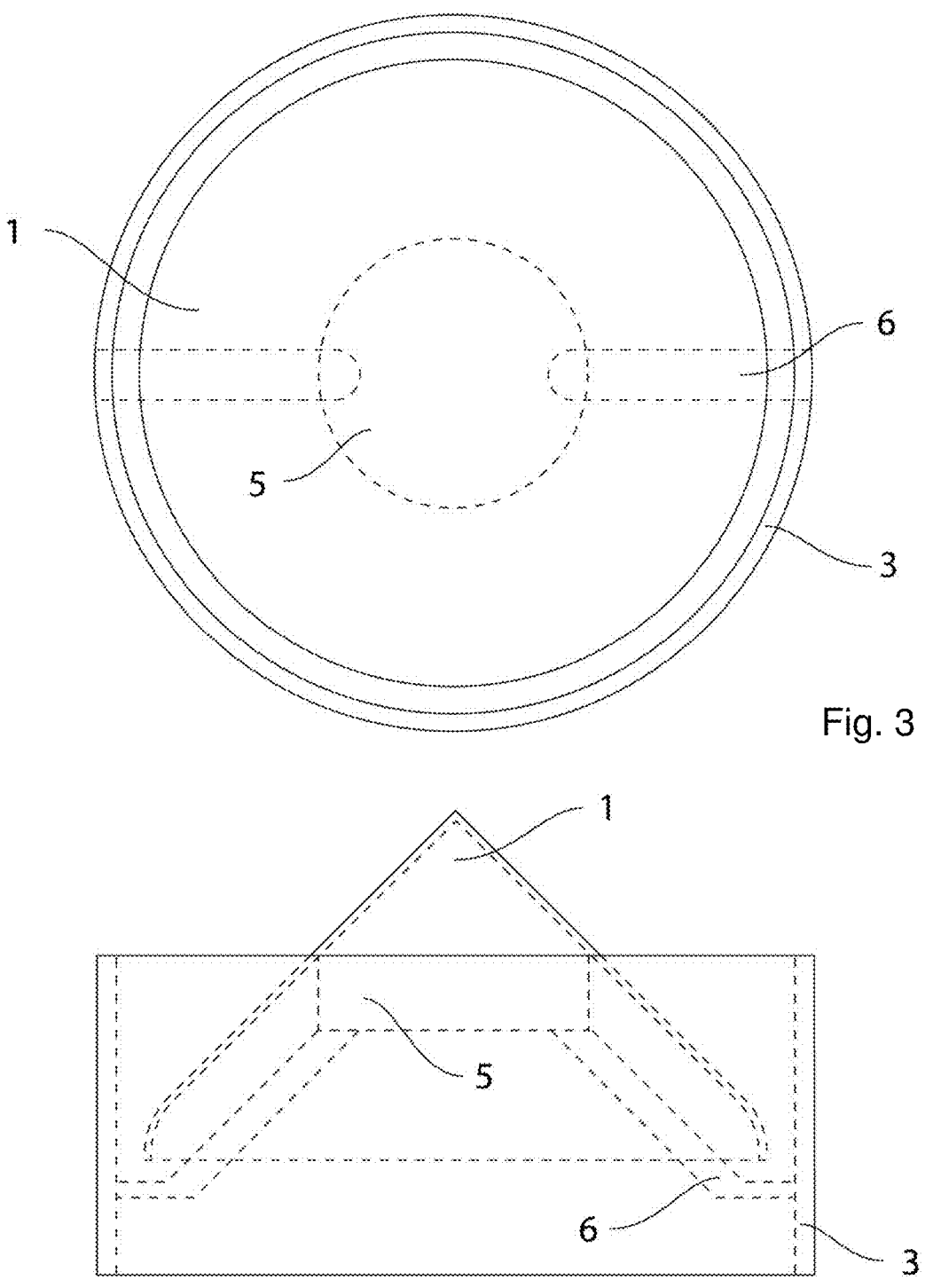
FIGS. 3 and 4 show top and front views of the first embodiment of high-frequency actuator 5, with a placement on mounts 6.
Figures 5, 6:
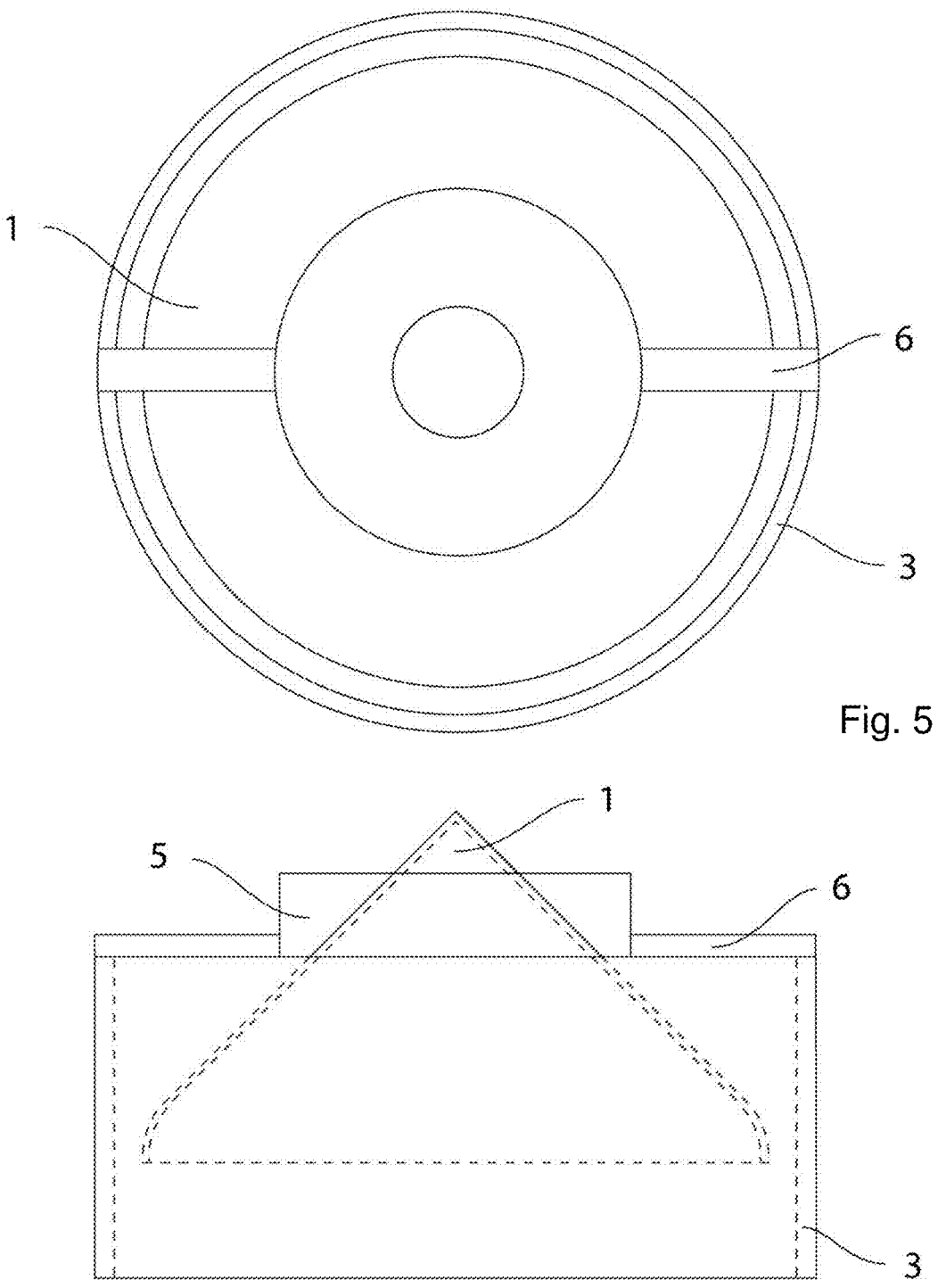
FIGS. 5 and 6 show top and front views of the second embodiment of high-frequency actuator 5, with a placement on mounts 6.

In the embodiment shown in FIGS. 3 and 4, the high-frequency linear actuator 5 is positioned on the first side of the gas propulsion element 1 and is connected using fastening mounts 6, which are secured to the cylindrical thrust chamber 3. In the embodiment shown in FIGS. 5 and 6, the linear actuator 5 is located on the second side of the propulsion element 1 and is similarly connected using fastening mounts 6 attached to the cylindrical thrust chamber 3.

Figure 7:
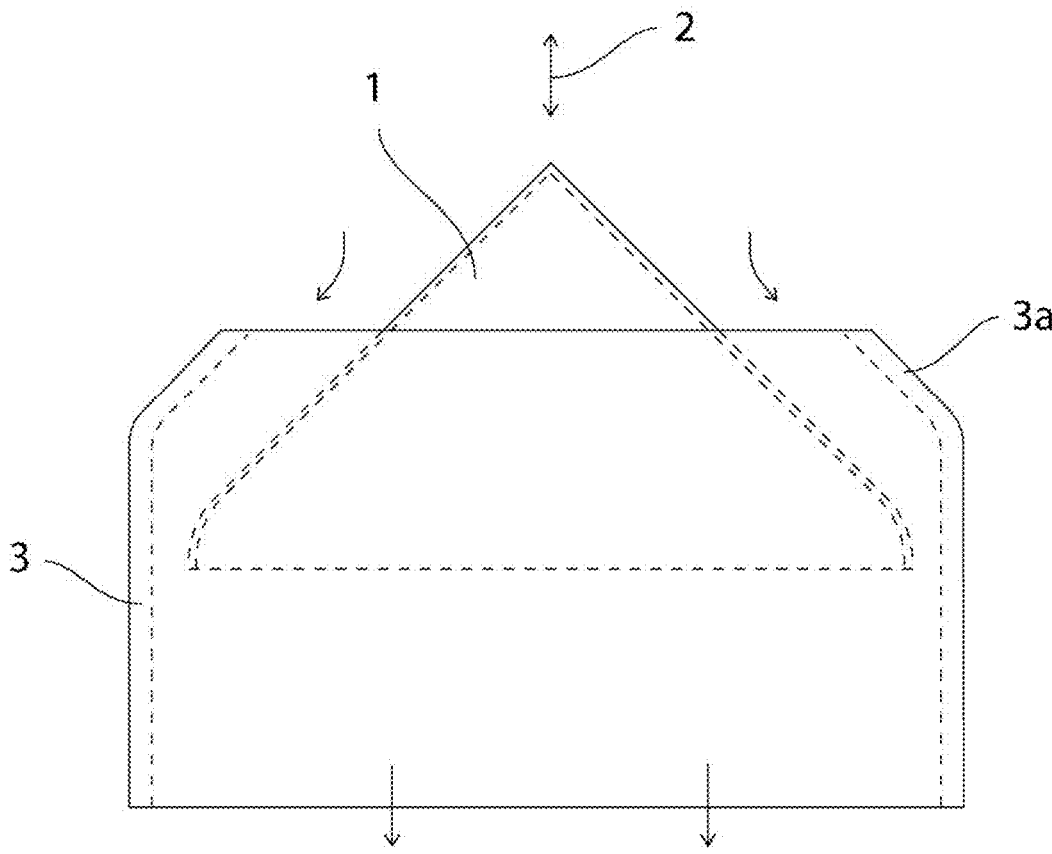
Figure 8:
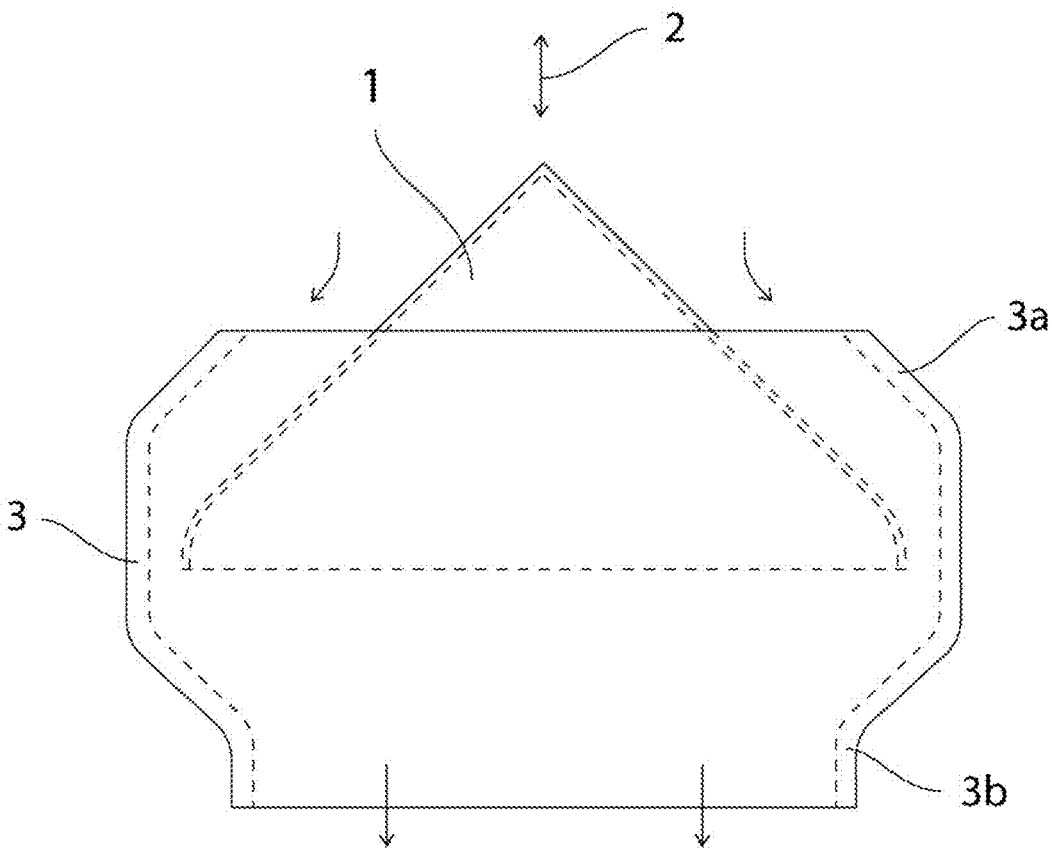
FIG. 8 is a front view of the thrust chamber 3 with a narrowed upper part 3a and a tapered conical section with a transition in the lower part 3b.

During the oscillatory reciprocal motion of the propulsion element 1, gas is expelled from its first side, while a portion of the gas is also displaced on the second, outer side, which can lead to a reduction in total thrust. To compensate for this effect, the embodiment shown in FIG. 7 incorporates a taper 3a in the upper section of the cylindrical thrust chamber 3, which is directed inward and generally follows the geometry of the propulsion element 1. Additionally, to increase thrust, the lower section of the cylindrical thrust chamber 3 features a tapered conical section 3b with a transition, as depicted in FIG. 8. The diameters of these tapered sections can be adjusted individually based on the required thrust level and the speed of the moving object.

Figure 9:
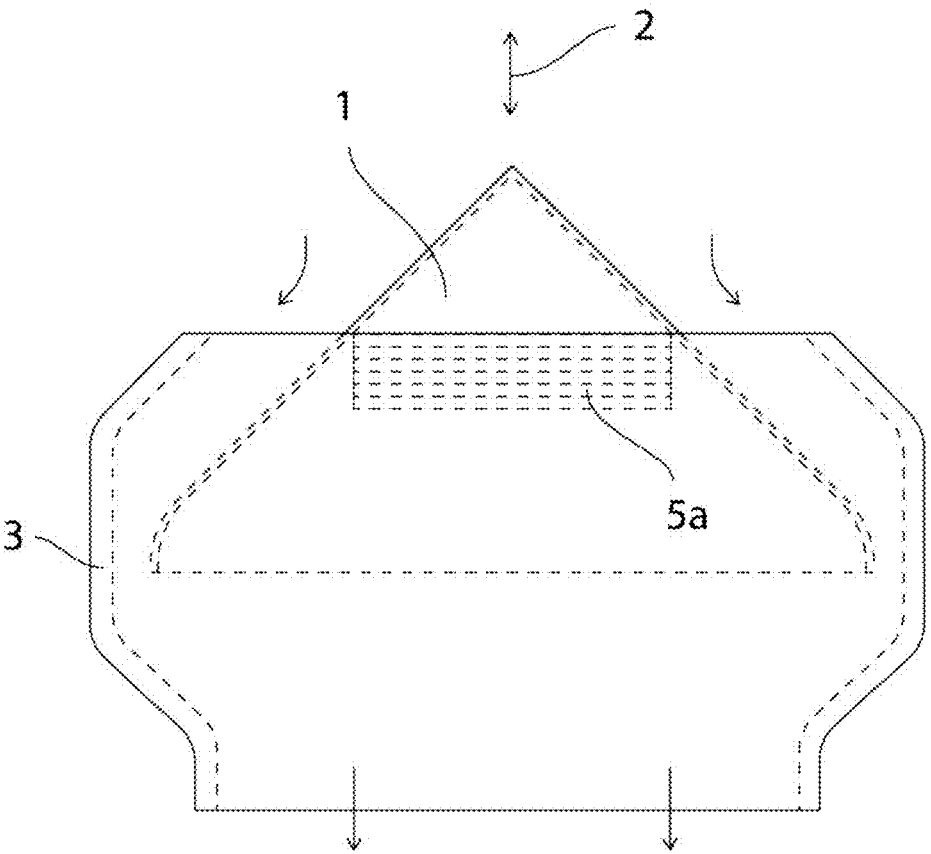
FIG. 9 is a front view of the gas propulsion element 1 with piezoelectric stack 5a as the high-frequency actuator.

In the embodiment of the gas propulsion thrust device shown in FIG. 9, a piezoelectric stack actuator 5a is shown and used as the linear high frequency actuator drive mechanism. This actuator consists of a multi-layered piezoelectric drive, comprising several layers of piezoelectric materials positioned between electrodes. Due to its multi-layered construction, the piezoelectric stack is capable of producing significantly greater extension or compression amplitudes compared to a single-layer piezoelectric actuator, resulting in more efficient device operation.

Figure 10:
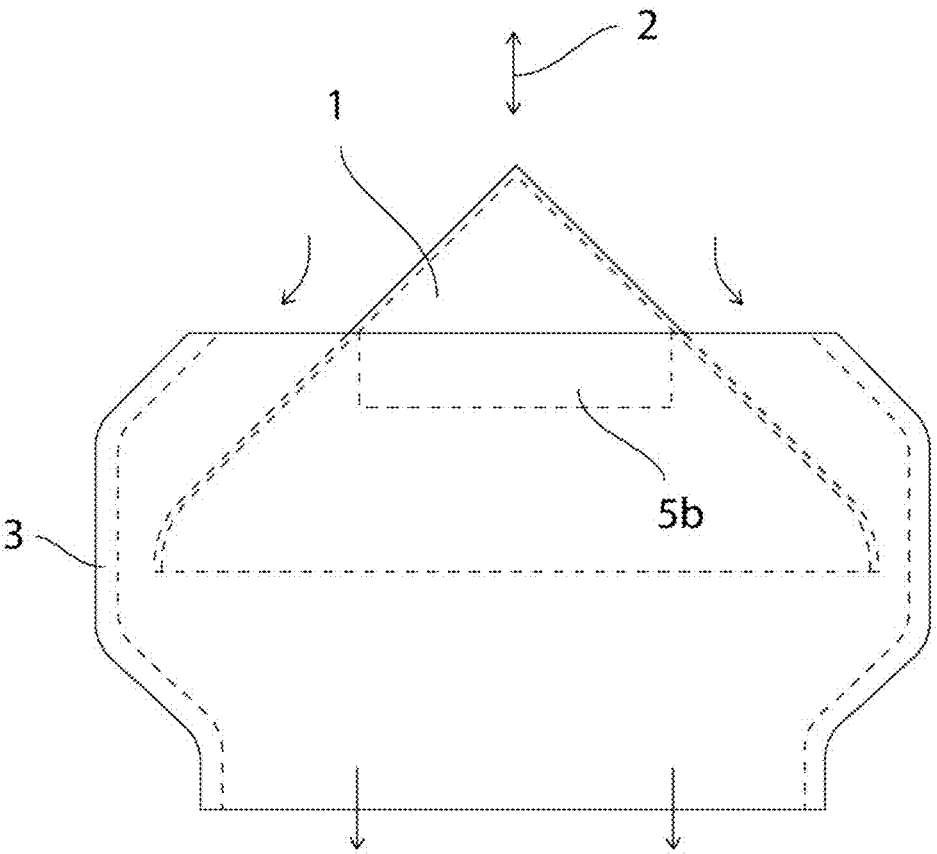
FIG. 10 shows a front view of the propulsion element 1 with a magnetostrictive transducer 5b as the high-frequency actuator.

In the next embodiment of the present invention shown in FIG. 10, a magnetostrictive transducer 5b is used as the high-frequency linear actuator, generating high-frequency oscillations through a variable magnetic field acting on the magnetostrictive material, causing it to change shape. Either one of the actuator types—the piezoelectric stack or the magnetostrictive transducer—can be selected based on the required oscillation frequency and power.

Figure 11:
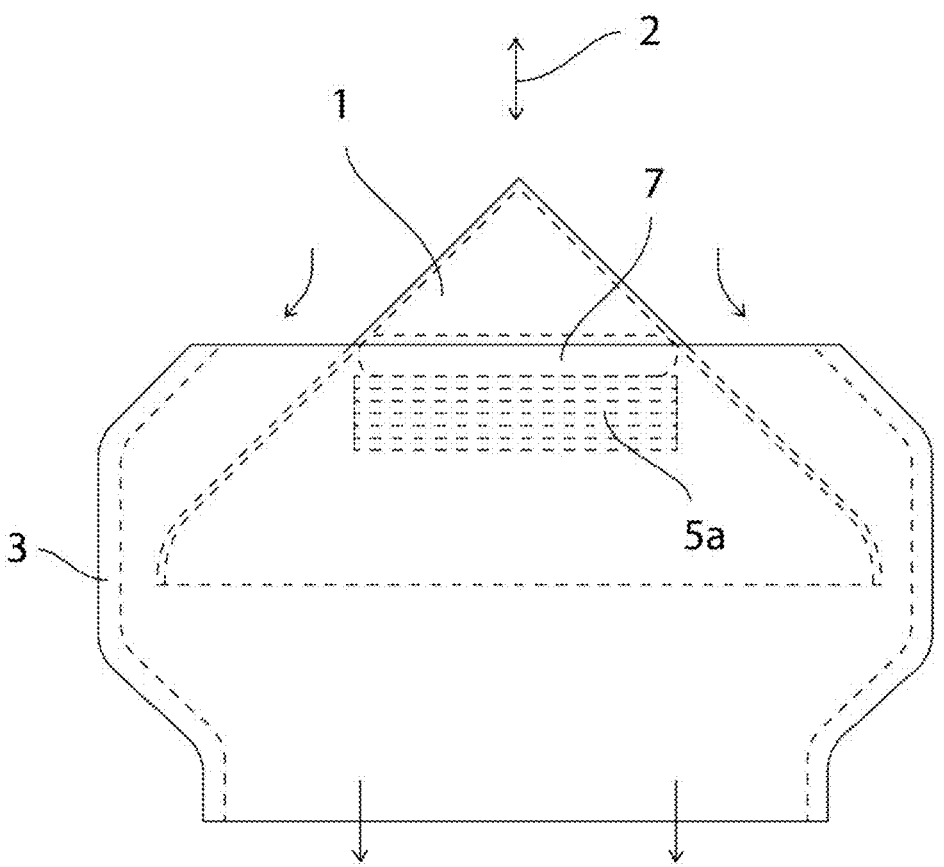
FIG. 11 is a front view of the gas propulsion element 1 with piezoelectric stack 5a and a resonator 7 as the high-frequency actuator.
Figure 12:
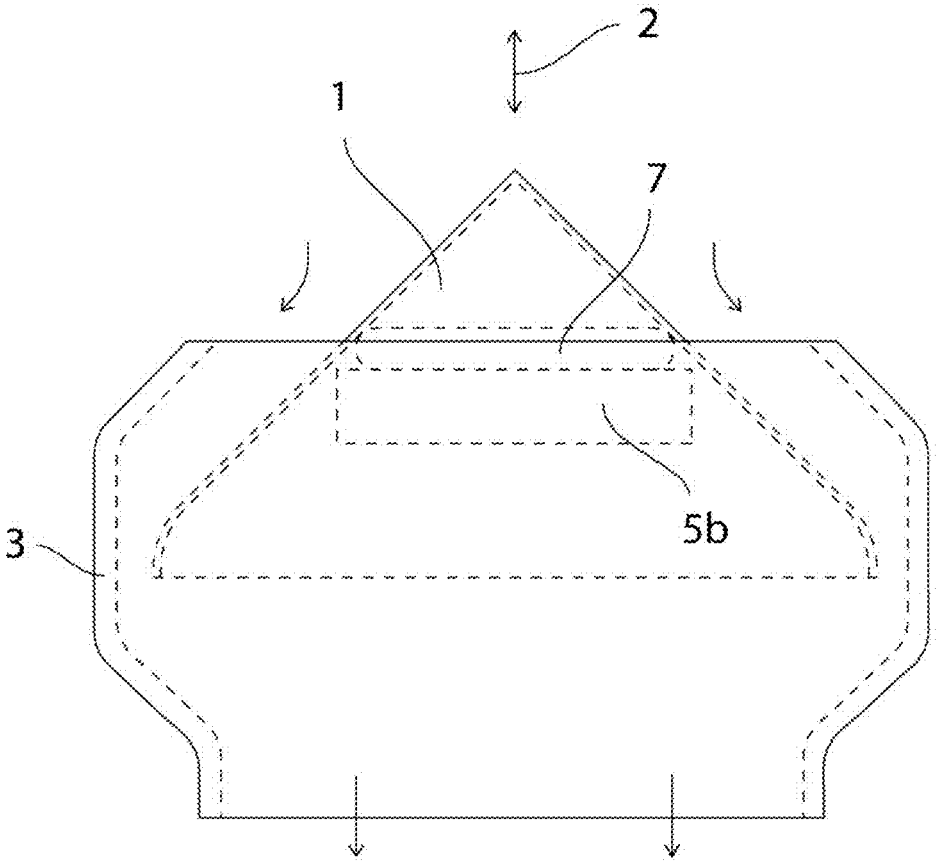
FIG. 12 is a front view of the gas propulsion element 1 with a magnetostrictive transducer 5b and a resonator 7 as the high-frequency actuator.

To further increase the oscillation amplitude of the gas propulsion element 1, whether using the piezoelectric stack 5a or the magnetostrictive transducer 5b, an ultrasonic resonator 7 is operatively connected to and configured to increase oscillations of the high-frequency linear actuator, as shown in FIGS. 11 and 12. The resonator 7 operates in a resonance mode as a mechanical amplifier, focusing the vibrations and amplifying oscillation amplitude.

Figure 13:
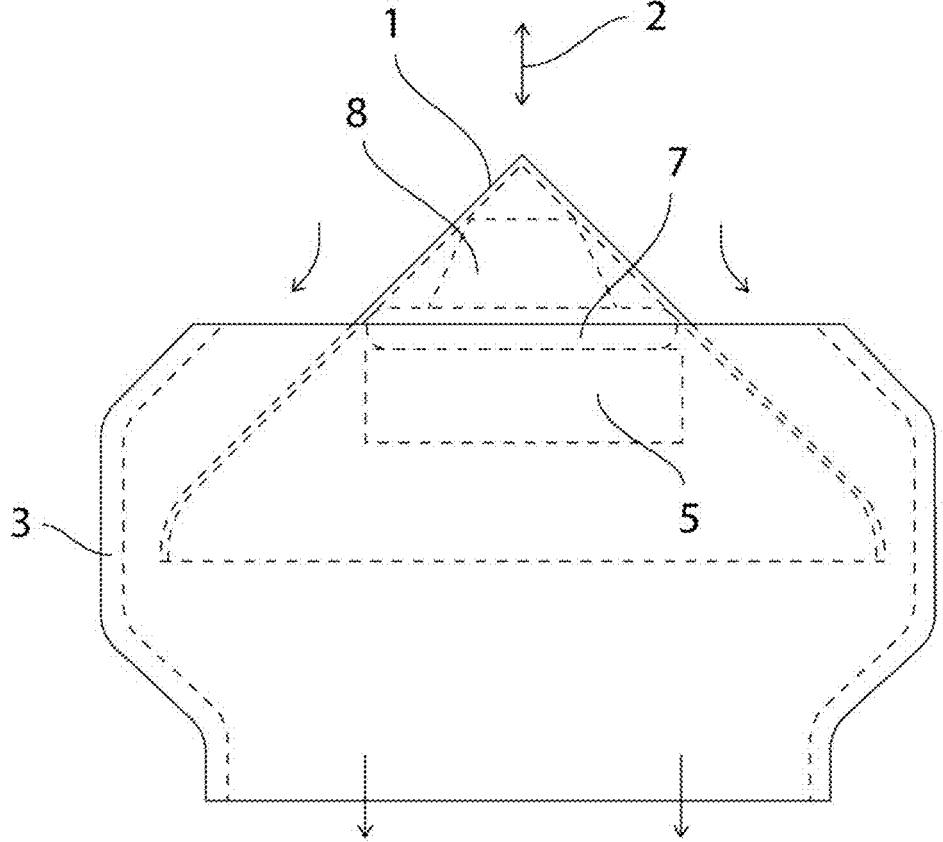
FIG. 13 illustrates a front view of the propulsion element 1 with a high-frequency actuator 5, resonator 7, and an ultrasonic horn 8 as the high-frequency actuator.

In the embodiment depicted in FIG. 13, the high-frequency linear actuator 5 is connected to both the ultrasonic resonator 7 and an ultrasonic horn 8, which further concentrates vibrational energy and enhances oscillation amplitude, thereby significantly improving the efficiency of gas propulsion.

Figures 14, 15:
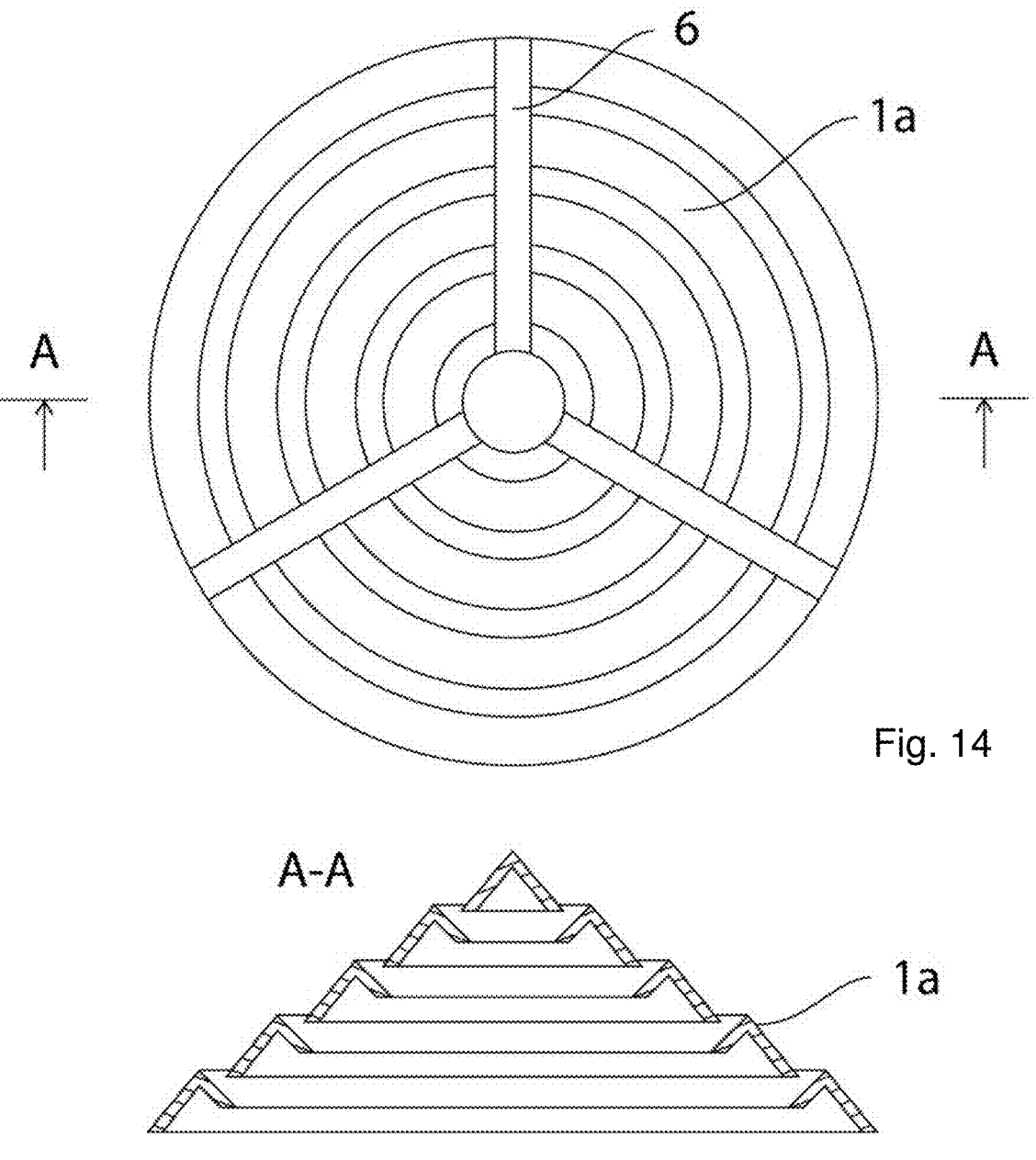
FIGS. 14 and 15 show top and front views of the propulsion element, shaped as a cone 1a and formed from radial hollow conical profiles spaced at intervals and connected by mounts 6.

The generally cone-shaped propulsion element may be formed as a series of concentric individual thrust elements 1a connected together with radial mounts 6. Gaps between individual elements 1a may be formed to help in causing the gas flow therethrough to be streamlined in the direction of the propulsion thrust. In the embodiment shown in FIGS. 14 and 15, the propulsion element has a conical shape and is composed of radial hollow conical profiles 1a, which are connected by fastening mounts 6. These profiles are arranged with gaps along the radius, with their radii decreasing in steps toward the tip of the element. This design optimizes gas movement from the second side of the propulsion element to the first side. As the propulsion element moves upward, gas flows through the gaps between the profiles across the entire diameter, while during downward motion, the gas is drawn into turbulence beneath the conical profiles and expelled downward into the cylindrical thrust chamber. This enhances thrust generation and ensures more efficient gas circulation.

Figures 16, 17:
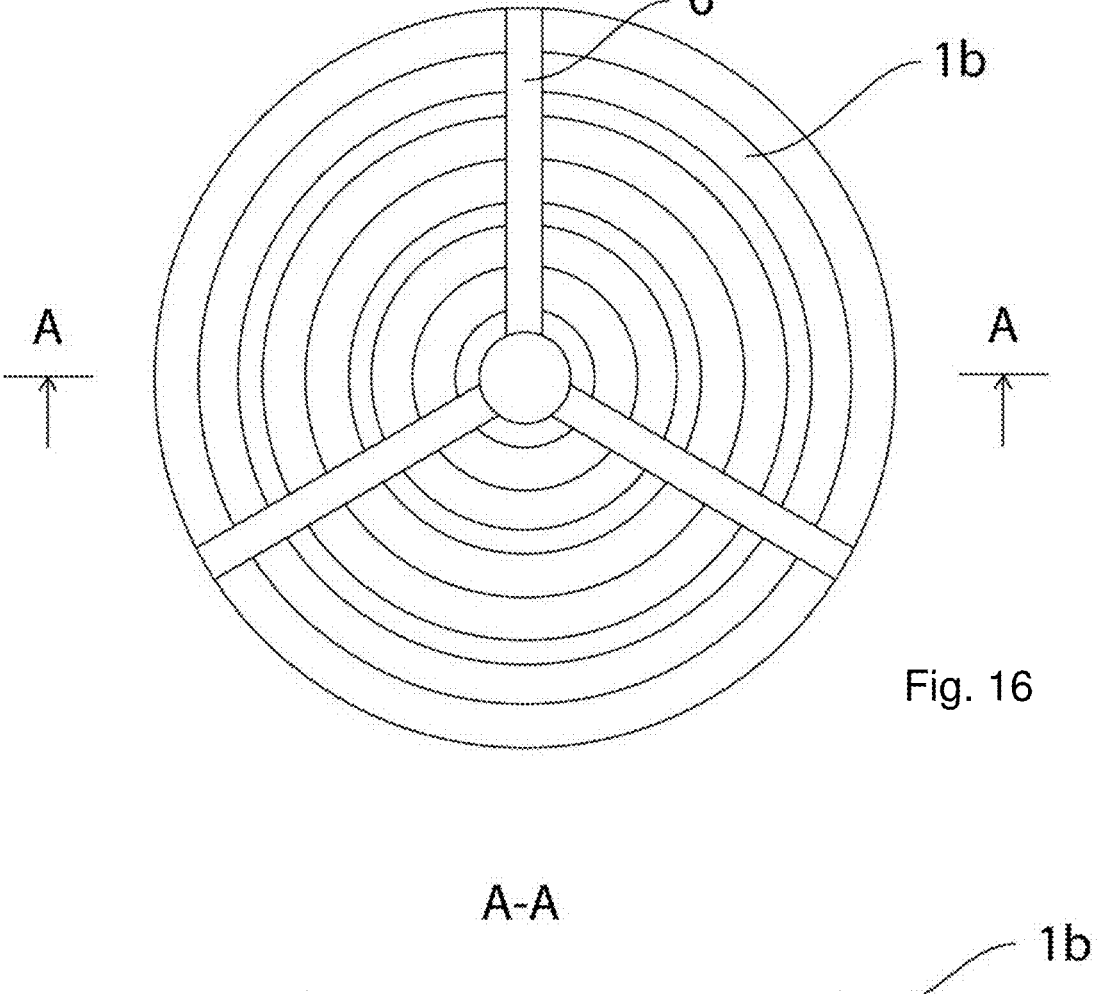
FIGS. 16 and 17 show top and front views of the propulsion element, shaped as a disk 1b and formed from radial hollow conical profiles spaced at intervals and connected by mounts 6.

In the simplified illustration of the next embodiment shown in FIGS. 16 and 17, the propulsion element has a disk-style shape and is composed of a concentric plurality of radial hollow conical profiles 1b, which are arranged with radial gaps along the radius and feature a stepped reduction in radius toward the center. The operating principle of the device remains similar to the previous embodiment.

Figures 18, 19:
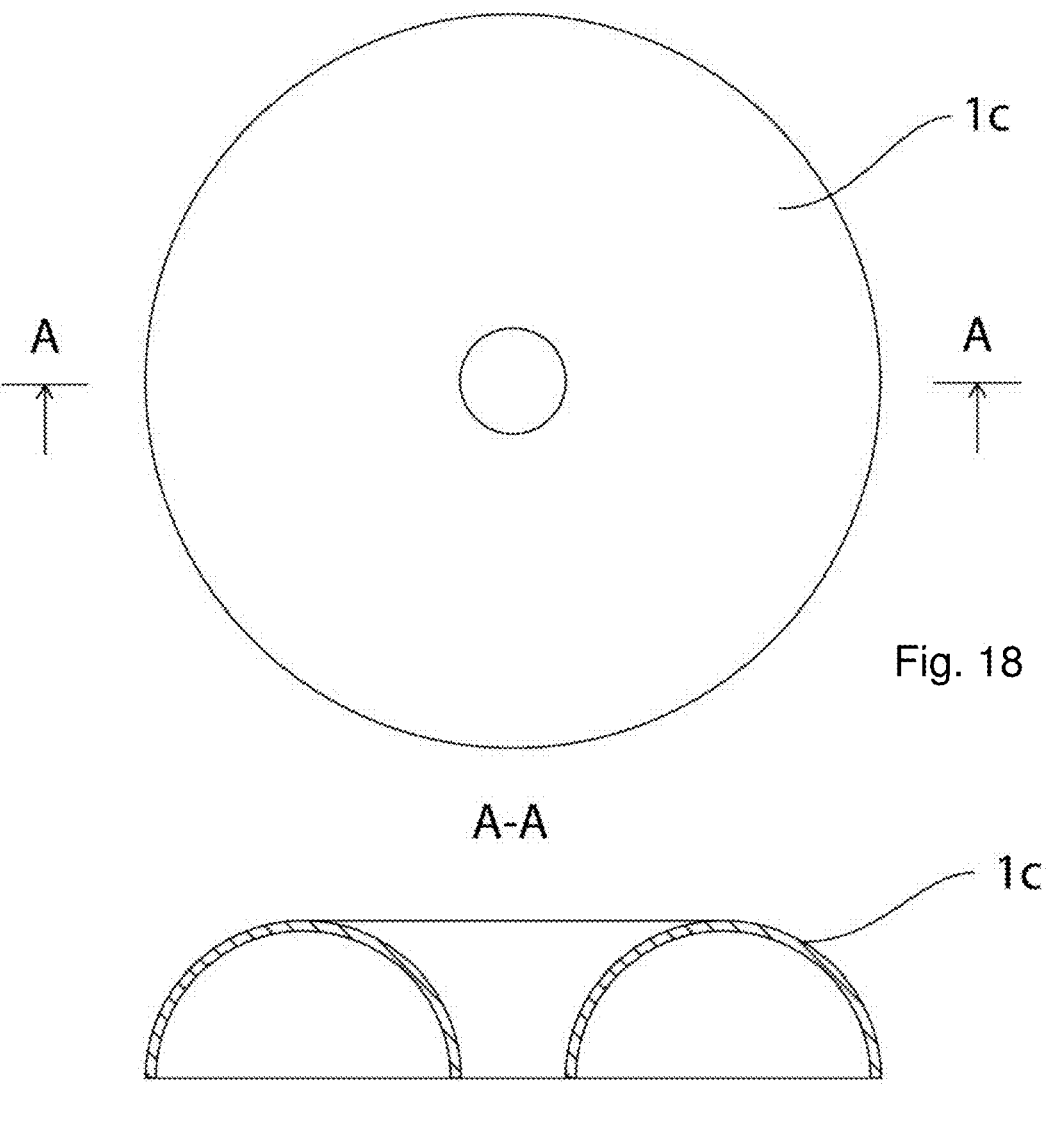
FIGS. 18 and 19 contain top and front views of the propulsion element, shaped as a torus 1c truncated along the horizontal plane with a central opening surrounded by a concave section directed towards the first side of the propulsion element.

In the embodiment depicted in FIGS. 18 and 19, the propulsion element is designed as a truncated half-torus 1c in the horizontal plane and includes a central through-hole. The concave section of the element 1c faces the first side of the gas propulsion element, facilitating the redistribution of the gas flow from the center to the periphery. This design allows for optimized interaction with additional components inside the cylindrical thrust chamber, such as a combustion chamber (described below), which may serve as a backup thrust source. The number, size, and spacing of the elements for this and previous embodiments, as well as their tilt angles and radii, can vary depending on specific requirements and do not limit the scope of the invention.

Figures 20, 21:
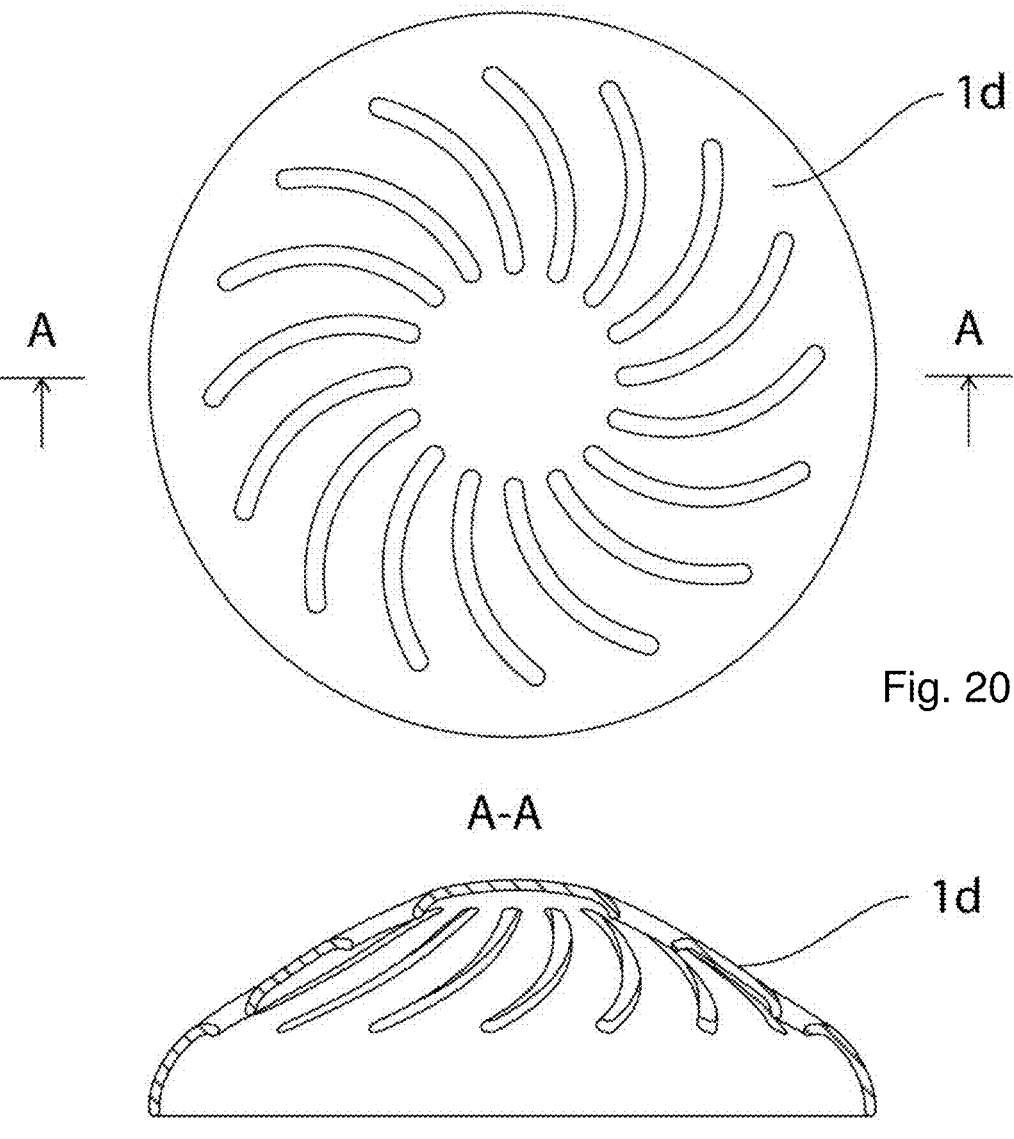
FIGS. 20 and 21 illustrate top and front views of the propulsion element, made as a dome 1d containing spiral openings arranged radially, with the edges of the holes bent inward towards the first side of the propulsion element.

In the embodiment shown in FIGS. 20 and 21, the propulsion element 1d has a dome shape with radially arranged spiral openings. Edges of these openings may be bent inward toward the first side of the propulsion element 1d. As the propulsion element moves toward its second side, gas flows through the spiral openings, inducing vortex motion that redirects it toward the first side in the region of the bent edges, where there are no openings. During the reverse motion toward the first side, the accumulated gas is expelled into the main flow, thereby enhancing thrust. The cyclical intake of gas through the spiral openings during upward motion and its expulsion during downward motion ensures continuous gas flow dynamics without the need for mechanical valves.

The configuration of the dome shape and spiral openings can be adapted based on the operating parameters of the device, such as the frequency and amplitude of the gas propulsion element's oscillations. The size, shape, and orientation of the openings can be optimized to maximize interaction between the gas flow and the propulsion element's surface, thereby improving the device's efficiency under various operational conditions.

Figures 22, 23:
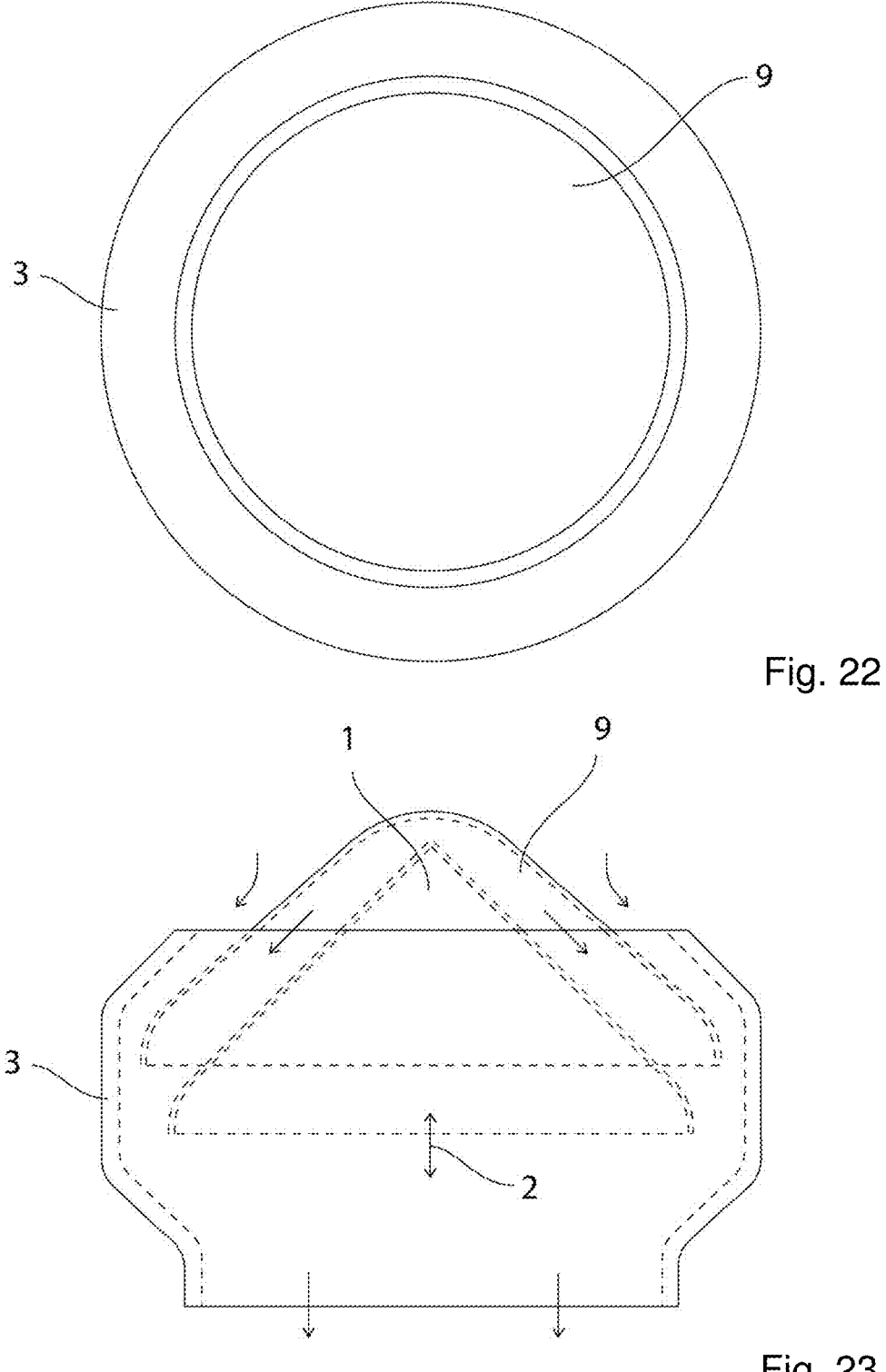
FIGS. 22 and 23 illustrate top and front views of the propulsion element 1 inside the thrust chamber 3 with a guiding cap 9 installed above it.

In the embodiment shown in FIGS. 22 and 23, a gas directing cap 9 is installed within the cylindrical thrust chamber 3 adjacent and outside the second side of the propulsion element, the gas cap is configured to direct gas around the second side and toward the first side of the propulsion element to prevent undesirable dispersion of the gas flow on the second side of the gas propulsion element 1. As the gas propulsion element 1 moves upward toward its second side, the gas directing cap 9 redirects the gas flow from the second side of the gas propulsion element 1 to its first side. The gas trapped between the second side of the propulsion element 1 and the gas directing cap 9 is displaced under the concave surface of the first side of the propulsion element 1 due to the Coanda effect.

The Coanda effect is the tendency of a gas flow to stay attached to a nearby surface, even a curved one, due to the pressure difference created by the gas flow entrainment of surrounding fluid. During the reverse motion of the propulsion element 1 toward its first side, the gas beneath the concave surface is redirected into the main thrust formation region, enhancing the thrust force.

Figures 24, 25:
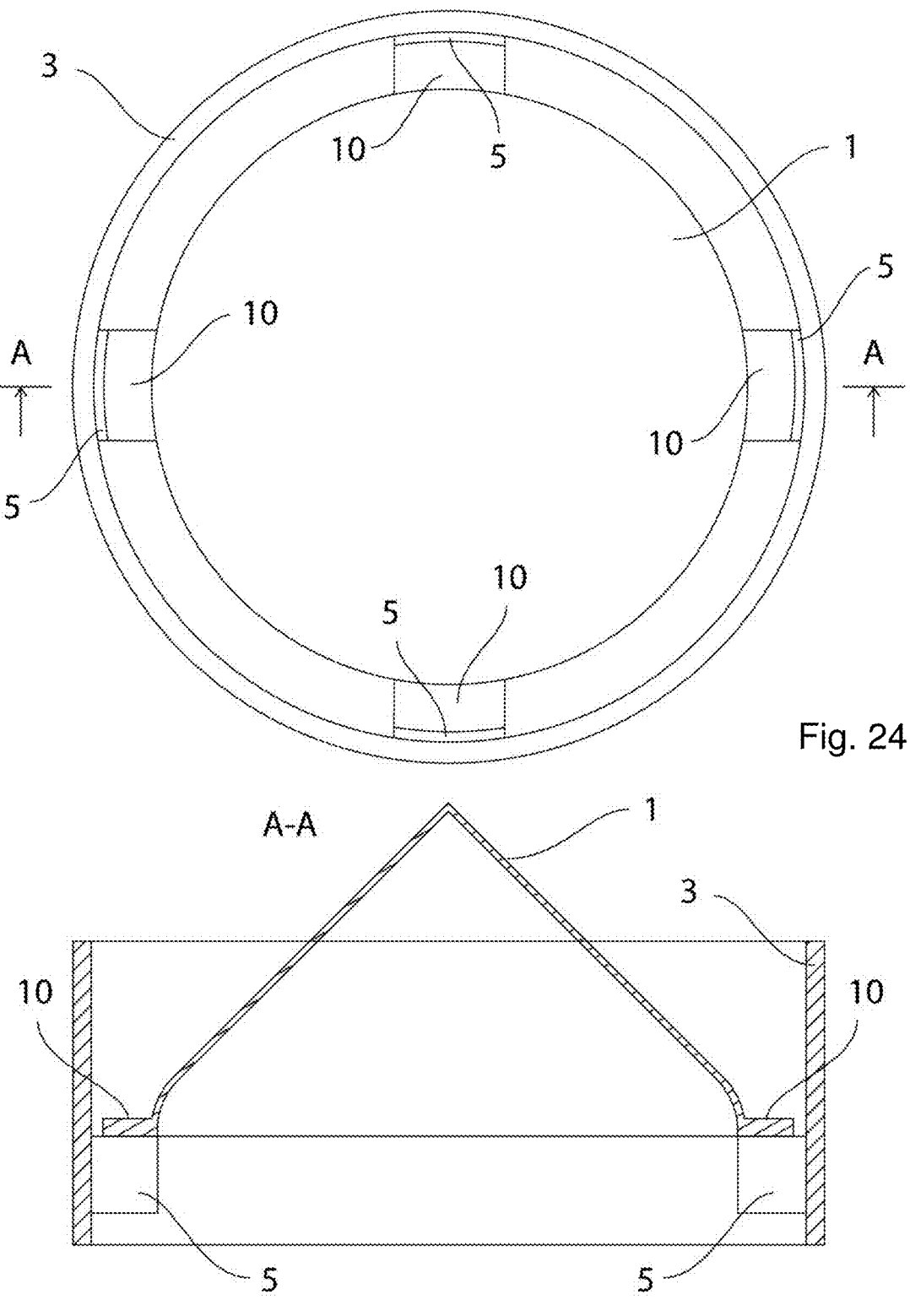
FIGS. 24 and 25 illustrate top and front views of the propulsion element 1 with protrusions 10 and secured on four high-frequency actuators 5, radially positioned inside the thrust chamber 3.

All previous embodiments were shown with a single high-frequency linear actuator 5 positioned in the center of the propulsion element 1. This is not the only way to use a high-frequency linear actuator, which may include a plurality of linear actuators positioned symmetrically along the outer edge of the propulsion element 1. In the embodiment shown in FIGS. 24 and 25, the gas propulsion element 1 features fours protrusions 10 mounted on four linear actuators 5, which are radially positioned at 90-degree intervals inside and around the cylindrical thrust chamber 3. This configuration allows for the use of smaller actuators, which improves gas circulation, and ensures emergency operation in case of failure of one of the linear actuators.

Figures 26, 27:
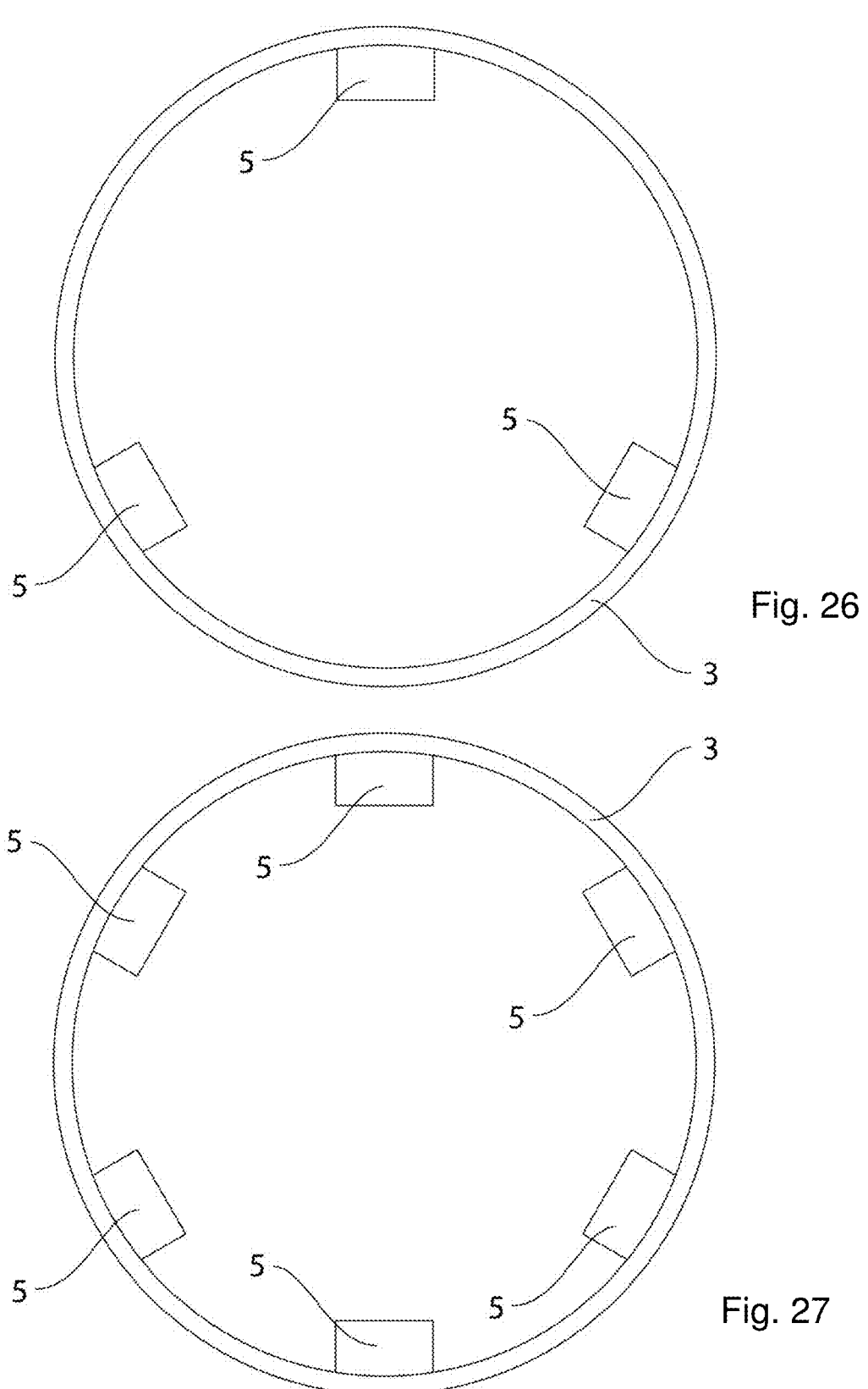
FIGS. 26 and 27 are top views with three and six variants of radial high-frequency actuator 5 placement inside the thrust chamber 3.

In the embodiment depicted in FIGS. 26 and 27, the cylindrical thrust chamber 3 may contain three or six radially arranged linear actuators 5. However, the number and placement of actuators are not limited to this configuration and may be adjusted based on operational requirements. For instance, additional linear actuators can be used to increase power and reliability, whereas reducing their number may be advantageous for minimizing the overall weight of the structure.

Figures 28, 29:
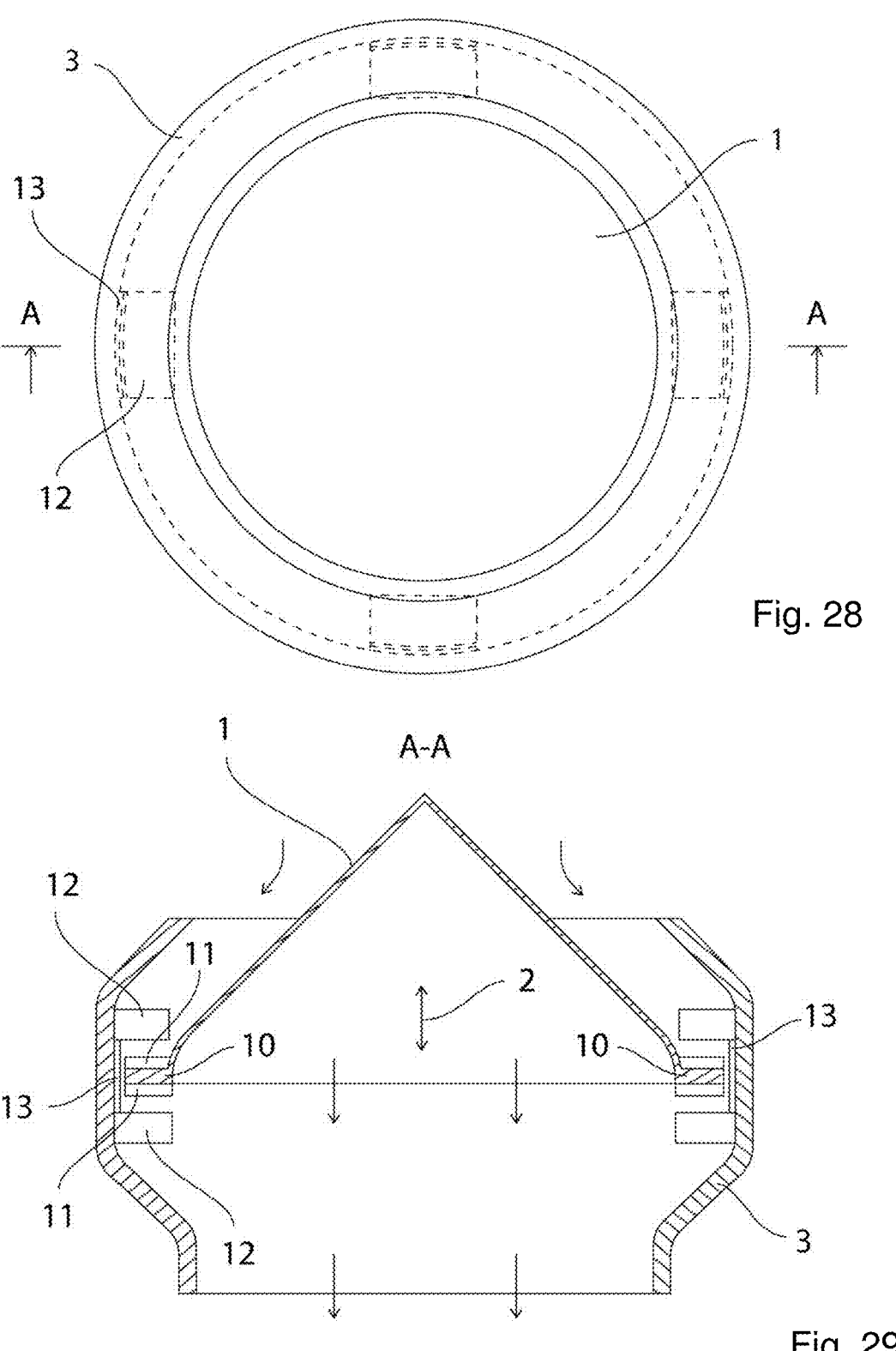
FIGS. 28 and 29 illustrate top and front views of the propulsion element 1 with magnetic levitation technology, comprising electromagnetic coils 11 secured on protrusions 10 from both sides thereof, permanent magnets 12 positioned inside the thrust chamber above and below the electromagnetic coils 11, and guide magnets 13 positioned opposite each protrusion 10.

FIGS. 28 and 29 show the embodiment of the present invention utilizing magnetic levitation as its principle of operation. During high-frequency oscillations, magnetic levitation may be preferred so as to reduce friction, which can otherwise cause overheating and component wear. In the embodiment shown in FIGS. 28 and 29, the gas propulsion element 1 features electromagnetic coils 11 on its protrusions 10 on both sides thereof. These electromagnetic coils 11 may be positioned to cooperate with permanent magnets 12 to form a magnetic levitation system configured to control position and cause reciprocal motion of the propulsion element 1 along the direction of propulsion thrust. The permanent magnets 12 may be installed inside the cylindrical thrust chamber 3 above and below the electromagnetic coils 11. To stabilize the position of the propulsion element 1, guiding magnets 13 may be placed between the permanent magnets 12 opposite each protrusion 10.

The gas propulsion thrust device of this embodiment operates as follows: when an electric current is applied to the electromagnetic coils 11, an electromagnetic field is generated, interacting with the permanent magnets 12, which, in turn, induces oscillatory motion of the gas propulsion element 1. The frequency and amplitude of oscillations are controlled by adjusting the characteristics of the input electrical signal, including its frequency, voltage, and current. Since there is no mechanical contact between the moving propulsion element 1 and the walls of the cylindrical thrust chamber 3, the energy losses are minimized and surface wear is eliminated. The guiding magnets 13 counteract potential deviations from the central position, stabilizing the trajectory of movement of the propulsion element 1.

The electrical control circuit to operate the device is not shown in the drawings, as it can be implemented using various known methods depending on specific requirements for oscillation frequency and amplitude. The design and placement of the electromagnetic coils 11 and permanent magnets 12 are not limited to the described configuration and may be adjusted based on operational conditions. In alternative implementations, the electromagnetic coils 11, which may include a single coil on each protrusion 10, may be positioned inside the cylindrical thrust chamber 3, while the permanent magnets 12 may be mounted on the protrusions 10 or other parts of the propulsion element 1. Other magnetic levitation techniques may also be applied to achieve the same effect, depending on operational requirements. Regardless of the specific configuration, the fundamental principle remains the same: the propulsion element 1 undergoes high-frequency oscillations without mechanical friction due to magnetic levitation thereof, ensuring the efficiency of the device and reducing component wear. This description is intended to illustrate the principles of system operation and should not be considered as limiting the scope of the claimed protection.

Figures 30, 31:
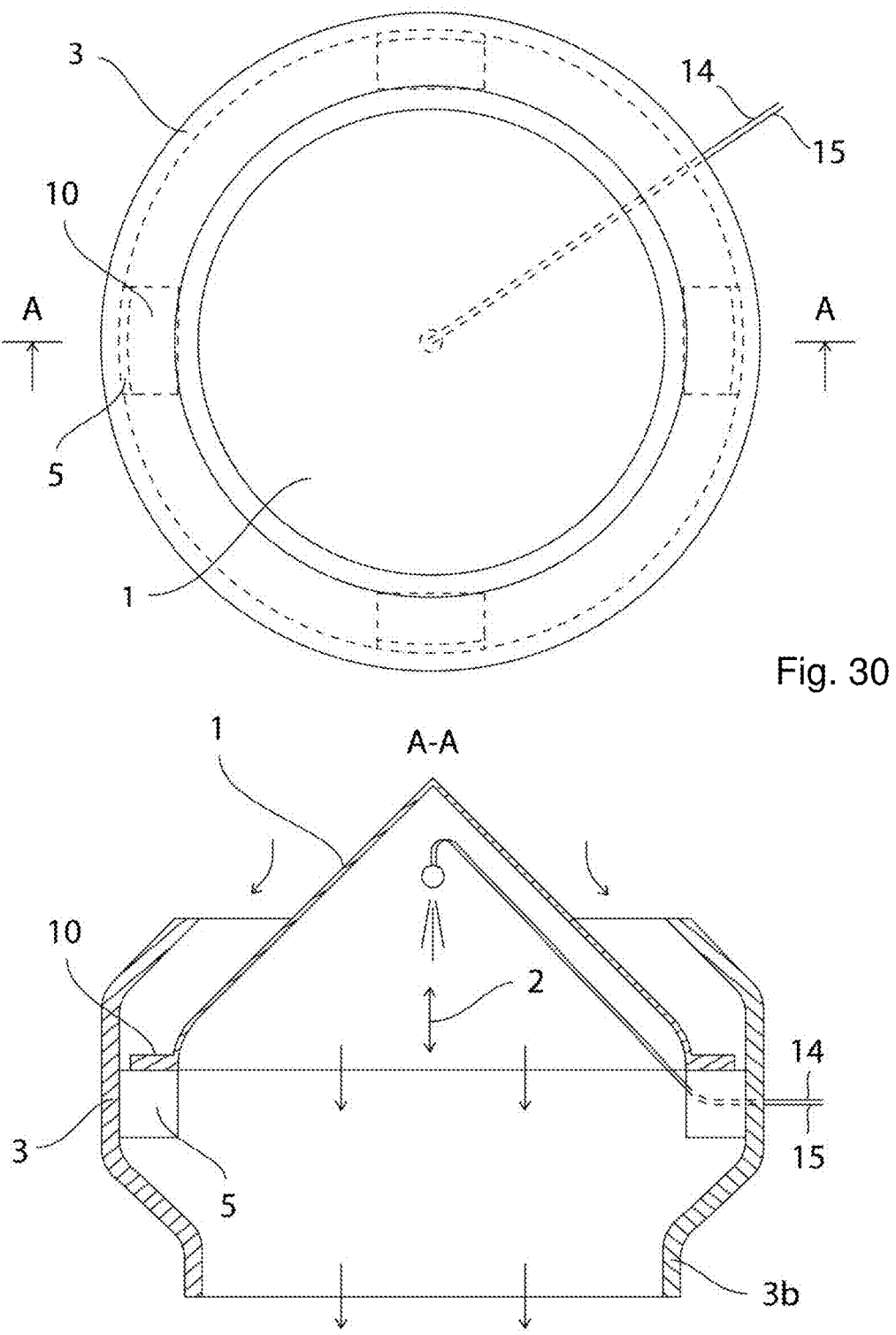
FIGS. 30 and 31 illustrate top and front views of the propulsion element 1 in the thrust chamber 3 with the supply of inert gases 14 and liquids 15.

The following is a description of further embodiments of the present invention using inert gases and liquids, see FIGS. 30 and 31. The driving force of the gas propulsion device of the invention can be significantly increased by fully or partially replacing the working gas in the cylindrical thrust chamber 3 with inert gases, liquids, or their combinations. The introduction of inert gas increases local pressure, while spraying liquids in the form of fine mist further alters flow dynamics, improving its characteristics. When using only inert gases, local pressure can increase by 20-30%, whereas the addition of liquids or their mixtures with gases can lead to an increase of up to 50%. This enhances thrust by increasing the mass of the working medium and modifying flow properties. To prevent rapid dissipation of working substances into the surrounding environment and to stabilize flow direction, the lower part of the cylindrical thrust chamber may be configured to include a tapered conical section 3b. The parameters of this section, including diameter and shape, can be adjusted based on the type of gas used and the device's operating conditions.

Inert gases such as argon, krypton, and xenon may be supplied into the cylindrical thrust chamber 3 from the first side of the gas propulsion element 1 through specialized inert gas supply system 14, shown in FIGS. 30 and 31, which is connected to external gas sources (not shown in the drawings).

Argon (with the density of 1.784 kg/m$^3$) has a higher density compared to air, allowing increased pressure within the chamber and enhancing thrust. This is particularly effective in a subsonic mode of operation when the gas outflow speed does not exceed 340 m/s. The efficiency of argon use depends on the oscillation conditions of the gas propulsion element, including frequency, amplitude, and chamber geometry.

Krypton (with the density of 3.749 kg/m$^3$) and xenon (with the density of 5.894 kg/m$^3$) have even higher densities, enabling the creation of greater local pressure and generating stronger thrust than argon. These gases are particularly effective when the maximum increase in working medium mass inside the chamber is required.

Helium (with the density of 0.1785 kg/m$^3$), on the other hand, has low density and is suitable for operational regimes where gas outflow speed approaches or exceeds the speed of sound. Due to helium's high sound velocity, its use reduces aerodynamic resistance, improves gas flow through the cylindrical chamber, and optimizes shock wave intensity. This is particularly beneficial in supersonic modes of operation, potentially increasing thrust efficiency by 30-50%, especially when the device operates at ultrasonic frequencies.

In addition to increasing local pressure and modifying flow structure, inert gases can be partially mixed with the existing gas medium inside the cylindrical thrust chamber 3 or completely replace it, providing independent reactive thrust in environments with insufficient air content. This is especially crucial for device operation in rarefied atmospheres and sealed systems where the composition of the working gas can be controlled and optimized for maximum efficiency.

Liquids can also be used to increase pressure inside the cylindrical chamber and generate reactive thrust. The liquid is introduced from the first side of the propulsion element 1 through specialized liquid supply system 15, shown in FIGS. 30 and 31, which is connected to an external liquid source (not shown in the diagrams). The working liquid can be water, a mixture of water and glycerin, or other liquid components that enhance density and viscosity. When injected into the thrust chamber 3, the liquid is dispersed into a fine mist, forming droplets up to 10 microns in size. The optimal droplet size is determined by cavitation conditions and interactions with acoustic waves generated by the propulsion element 1. Specifically, at oscillation frequencies of 20 kHz and above, cavitation processes intensify, promoting the formation and collapse of microbubbles. This process is accompanied by localized pressure surges and energy release, which can partially be converted into additional thrust. The addition of glycerin solutions increases the stability of cavitation bubbles, prolongs their existence, and enhances their interaction with acoustic waves. This leads to more efficient utilization of the energy from gas propulsion element oscillations, potentially increasing thrust depending on the volume of dispersed liquid, its composition, and temperature.

The process of increasing pressure within the device may be accompanied by multi-bubble sonoluminescence-a phenomenon in which light is emitted due to the collapse of cavitation bubbles, indicating energy release. In this device, sonoluminescence becomes possible due to the formation of standing waves with alternating zones of localized pressure increase. These waves create nodes and antinodes: pressure is minimal in the nodes, while in the antinodes, localized high-pressure zones emerge, sufficient to induce sonoluminescence. The intensity of this phenomenon can be further enhanced by introducing inert gases such as argon and xenon, which help stabilize cavitation and increase the temperature inside collapsing bubbles. This raises the likelihood of gas transitioning into a plasma state, accompanied by intensified energy release and light emission. The efficiency of this process depends on pressure parameters, the composition of the liquid, and the external environment in which the device operates.

The use of inert gases, liquids, or their mixtures is particularly effective in environments where access to the atmosphere is limited or impractical, ensuring system stability and efficiency in conditions where air cannot serve as the working medium. In cases where inert gases and liquids are partially mixed with atmospheric air, such a mixture proportionally increases generated thrust by enhancing cavitation effects and local pressure.

A skilled professional in this field will recognize that the composition of inert gas mixtures, as well as liquid-inert gas combinations, can be adjusted. By modifying gas concentration, liquid volume, and injection modes, the system can be adapted to specific operational conditions. However, the core objective remains unchanged: utilizing inert gases and their mixtures with liquids in this system enhances thrust by amplifying cavitation effects and increasing pressure. The methods of injecting inert gases and liquids are not limited to those depicted in the drawings; for example, inert gases and liquids may be injected uniformly along the radius of the thrust chamber or injected through an opening in the top of the gas propulsion element, and other variations thereof.

Figure 32:
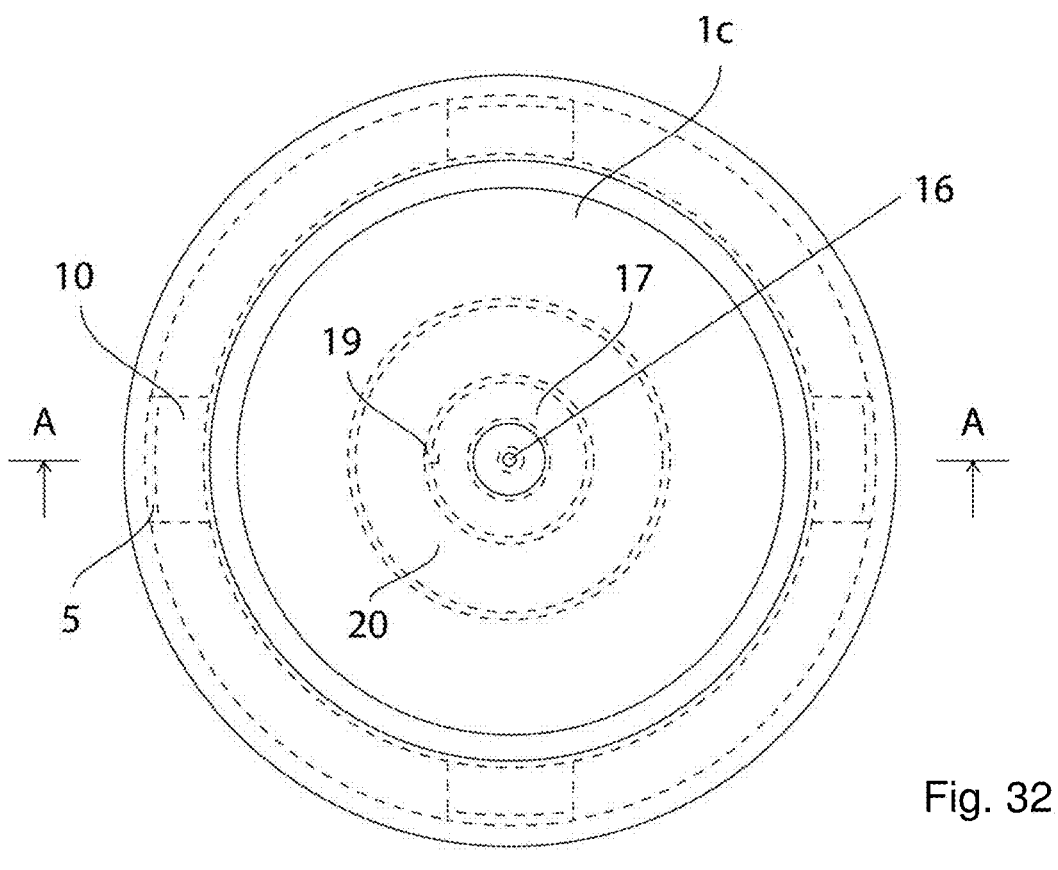
FIGS. 32 and 33 illustrate top and front views of the device equipped with a combustion chamber 17 positioned inside the thrust chamber 3, containing a fuel supply system 16, an air supply 20, a one-way valve 18, a fuel ignition system 19, and a nozzle 21.
Figure 33:
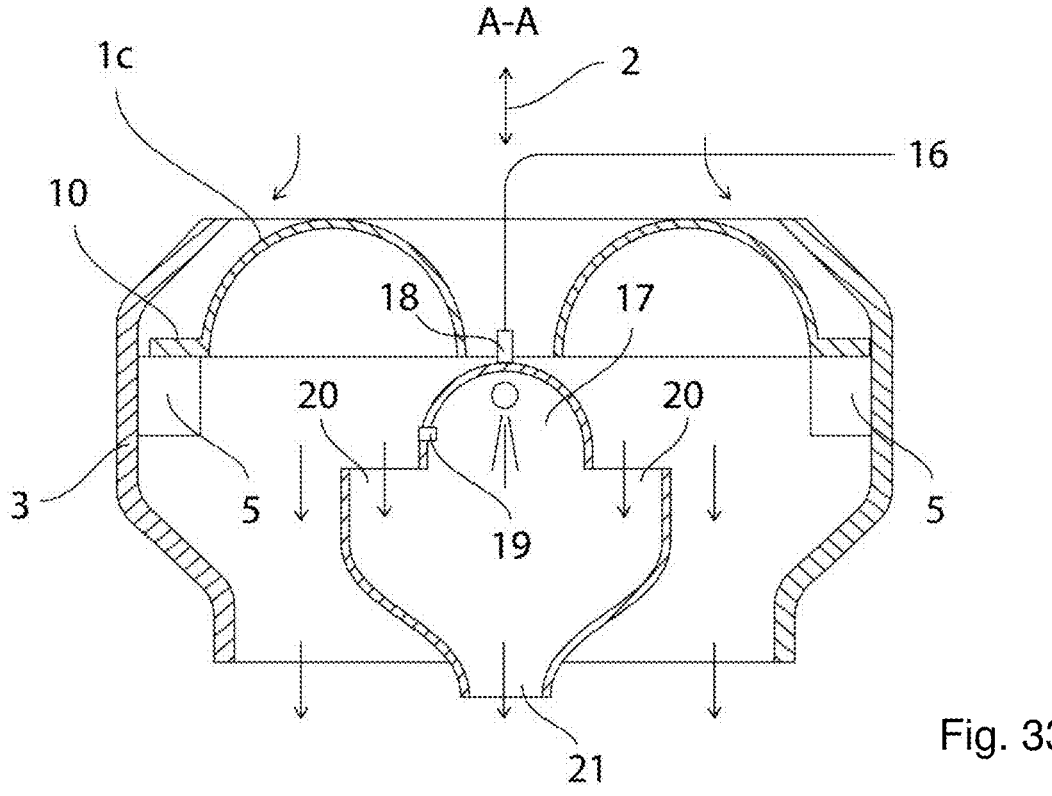

An additional method of using the gas propulsion element is its integration with a combustion chamber. The use of a combustion chamber is now described with reference to the embodiment illustrated in FIGS. 32 and 33. When using the combustion chamber 17, shown in FIGS. 32 and 33, fuel is injected into it through the one-way valve 18 as provided by a fuel supply system 16, connected to external fuel source (not shown in the drawings), and air is supplied to the air supply 20 by the air flow generated on the concave first side of the propulsion element 1c. In the combustion chamber 17, the fuel mixes with the incoming air, and the formed fuel-air mixture is ignited by an ignition system 19. Hot gases are generated during combustion and exit through the nozzle 21, creating additional thrust on top of that provided by the propulsion element 1c.

Figure 34:
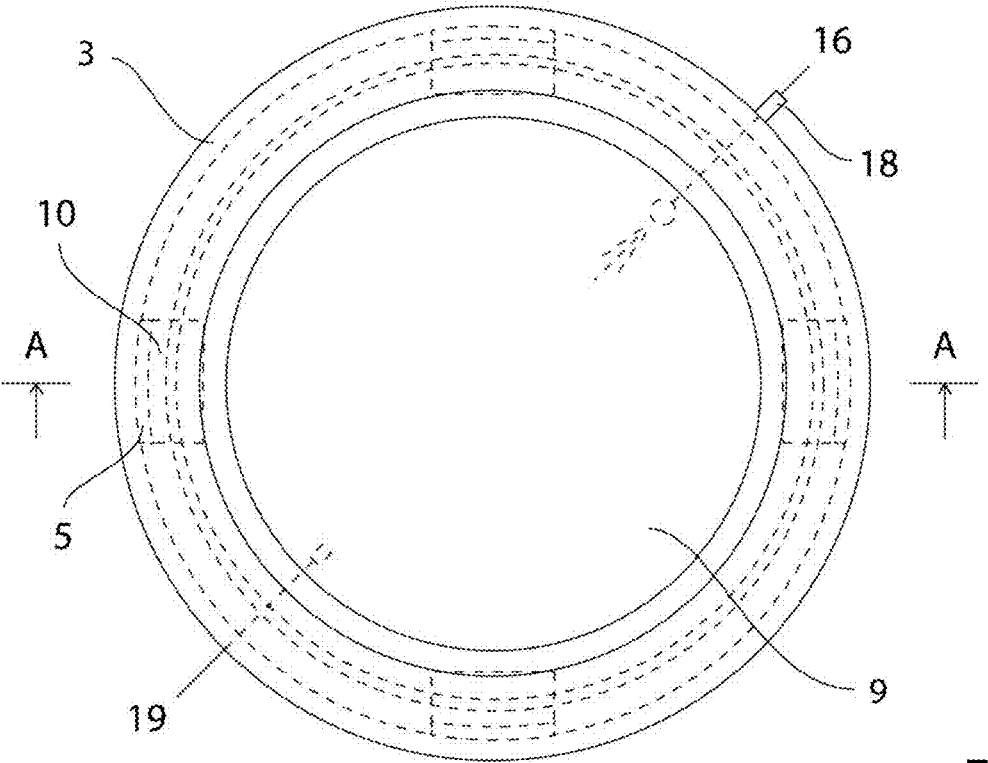
FIGS. 34 and 35 illustrate top and front views of the propulsion element 1 inside the thrust chamber 3 (which itself serves as a combustion chamber) with a guiding cap 9 installed above it, a fuel supply system 16, a one-way valve 18, and a fuel ignition system 19.
Figure 35:
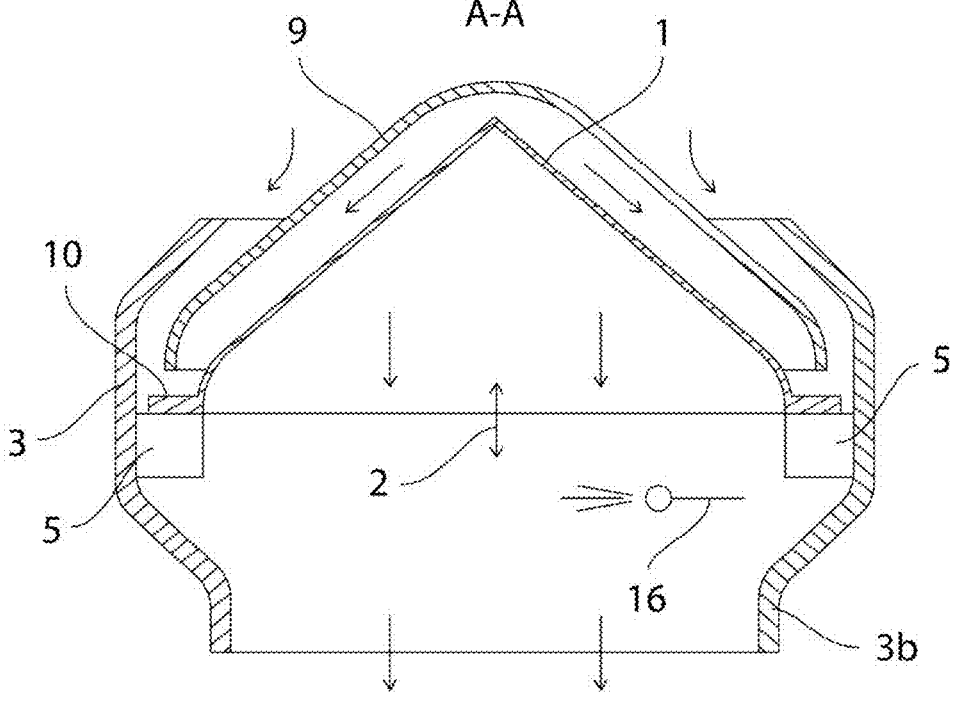

In another embodiment, the propulsion element 1 is used with the thrust chamber 3 acting as a combustion chamber, as shown in FIGS. 34 and 35. In embodiments, the combustion chamber features a combustion space formed within the thrust chamber 3. The thrust chamber 3 is configured to facilitate creating the combustible fuel mixture in the combustion space from the gas contained therein and a fuel injected into the combustion space.

When utilizing the thrust chamber 3 in this manner, fuel is injected directly therein through a fuel supply system 16, connected to an external fuel source (not shown in the drawings), with a one-way valve 18 preventing fuel backflow into the fuel supply system. Air is present in the thrust chamber and is, therefore, supplied into the combustion space from the concave first side of the propulsion element 1. Within the combustion space of the thrust chamber 3, the fuel mixes with the incoming air, the combustible fuel mixture is formed and then ignited by an ignition system 19, and hot gases exit through the tapered conical section 3b, adding thrust to that generated by the propulsion element 1.

The fuel supply may be regulated so that the pressure in the combustion chamber 17 or the combustion space of the thrust chamber 3 does not exceed the pressure created by the propulsion element 1c. This ensures a directed gas flow through the nozzle 21 and prevents combustion products from flowing back through the air supply 20. Pressure regulation may be achieved by controlling the fuel supply, the volume of the supplied air, and the geometry of the nozzle 21 or the tapered conical section 3b.

The increase in propulsion force in the device equipped with a combustion chamber 17 or thrust chamber 3 acting as a combustion chamber depends on the size of the combustion chamber, the type of fuel used, the proportion of fuel-to-air mixture, and other factors known to experts in the field. The presence of the combustion chamber offers an additional advantage—the device can continue to operate even in the event of a failure of the electric drive moving the gas propulsion element.

The methods of fuel and air supply to the combustion chamber 17 or thrust chamber 3 acting as a combustion chamber, as well as the parameters of the air supply, the nozzle 21 or tapered conical section 3b, the configurations of the fuel mixture supply system and ignition system, depicted in the drawings, are schematic and may be modified depending on the structural features of the gas propulsion thrust device and the tasks at hand; for example, the combustible fuel mixture may be injected uniformly along the radius of the combustion chamber or injected through an opening in the top of the gas propulsion element, and other variations thereof.

USES OF THE INVENTION

The described invention demonstrates that the use of a cylindrical chamber with a narrowed upper part and a tapered conical section at the lower part, a guide cap, and a gas propulsion element with improved geometry significantly increases the efficiency of the system, enhancing the thrust generated and ensuring stable gas flow direction.

The application of inert gases, liquids, and their mixtures in the device's design reduces dependence on traditional fuel combustion, minimizing harmful emissions and reducing environmental impact. The device also shows high adaptability to conditions with limited access to the atmosphere.

Moreover, the device can operate with a combustion chamber as part of a hybrid system, providing additional thrust when needed. This concept facilitates the effective integration of the device during the transition to electric propulsion in the aerospace, transport, and energy sectors, offering flexibility and stable operation under various operating conditions.

Ability to operate at supersonic speeds and the use of advanced materials allows the device to perform in various promising applications in aviation, space, and industrial systems, where compactness, cost-effectiveness, and efficiency are key requirements. The proposed technologies set new standards for engine design, creating a platform for further innovations in modern engineering.

The presented gas propulsion device technology has the potential to become an effective solution for developing environmentally friendly and highly efficient engines. Its versatility allows the device to be used in aerospace and transportation industries, where high efficiency, flexibility, and emission reduction are essential. Computer simulations show that the generated thrust significantly exceeds the performance of traditional propeller engines, confirming the high potential of the technology. These results highlight its significance for further development and possible integration into future engineering solutions, contributing to technological progress and national interest.

It is contemplated that any embodiment discussed in this specification can be implemented with respect to any method of the invention, and vice versa. It will be also understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference. Incorporation by reference is limited such that no subject matter is incorporated that is contrary to the explicit disclosure herein, no claims included in the documents are incorporated by reference herein, and any definitions provided in the documents are not incorporated by reference herein unless expressly included herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12, 15, 20 or 25%.

All of the devices and/or methods disclosed and claimed herein can be made and executed without undue experimentation in light of the present disclosure. While the devices and methods of this invention have been described in terms of preferred embodiments, it will be apparent to those of skill in the art that variations may be applied to the devices and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A gas propulsion thrust device comprising:
   a cone-shaped propulsion element having a rigid concave first side, the concave first side extends to an outer edge and is axisymmetric about a longitudinal axis aligned along the direction of propulsion thrust, the propulsion element having a convex second side adjacent to the concave first side, the propulsion element is submerged in and surrounded by gas,
   a high-frequency linear actuator aligned along a direction of propulsion thrust, the high-frequency linear actuator operates at a frequency from 500 Hz to 200 kHz and is operatively cooperating with the propulsion element to cause reciprocal motion thereof along the longitudinal axis and along the direction of propulsion thrust, wherein the high-frequency linear actuator comprises a plurality of linear actuators positioned symmetrically around and individually spaced along the outer edge of the propulsion element,
   a thrust chamber supporting the high-frequency actuator fixedly attached thereto, the thrust chamber surrounds the propulsion element while being spaced away from the outer edge thereof by a gap configured to direct gas from the second side to the first side of the propulsion element, wherein the thrust chamber is shaped to maintain the same gap throughout a reciprocal motion of the propulsion element within the thrust chamber, the thrust chamber is shaped to narrow and taper around the propulsion element at the second side thereof, and
   a gas directing cone-shaped cap mounted on the thrust chamber adjacent and outside the second side of the propulsion element, the gas directing cone-shaped cap is configured to direct gas around a periphery thereof and further around the second side and toward the first side of the propulsion element,
   wherein the thrust chamber and the gas directing cone-shaped cap are submerged in and surrounded by the gas surrounding the cone-shaped propulsion element,
   wherein the reciprocal motion of the propulsion element within the thrust chamber is done without altering the shape of the propulsion element, and
   wherein the reciprocal motion of the propulsion element forms a high gas pressure zone on the concave first side of the propulsion element and a low gas pressure zone on the convex second side thereof, thereby generating a gas pressure differential across the propulsion element and along the direction of propulsion thrust causing propulsion of gas away from the concave first side of the propulsion element and in a direction opposite the direction of propulsion thrust.

2. The gas propulsion thrust device, as in claim 1, further comprising an inert gas supply system configured for injecting an inert gas in the thrust chamber on the first side of the propulsion element, the inert gas being different from the gas surrounding the propulsion element.

3. The gas propulsion thrust device, as in claim 1, further comprising a liquid supply system configured for injecting a mist of liquid in the thrust chamber on the first side of the propulsion element, wherein the liquid is different from the gas surrounding the propulsion element and may be mixed therewith.

4. The gas propulsion thrust device, as in claim 1, wherein the first side is spaced apart from the second side to define a thickness of the propulsion element to be less than a diameter of the outer edge thereof.

5. The gas propulsion thrust device, as in claim 4, wherein the first side of the propulsion element is parallel to the second side thereof.

6. The gas propulsion thrust device, as in claim 2, wherein the inert gas supply system is positioned within the concave first side of the propulsion element.

7. A gas propulsion thrust device comprising:

a cone-shaped propulsion element having a rigid concave first side, the concave first side extends to an outer edge and is axisymmetric about a longitudinal axis aligned along the direction of propulsion thrust, the propulsion element having a convex second side adjacent to the concave first side, the propulsion element is submerged in and surrounded by gas, the propulsion element is equipped with a plurality of electromagnetic coils, a magnetic levitation high-frequency linear actuator aligned along a direction of propulsion thrust, the high-frequency linear actuator operates at a frequency from 500 Hz to 200 kHz and comprises a plurality of permanent magnets operatively cooperating with the plurality of electromagnetic coils of the propulsion element to form a plurality of electromagnets, the electromagnetic coils configured to control position and cause reciprocal motion of the propulsion element along the direction of propulsion thrust, wherein the magnetic levitation high-frequency linear actuator comprises a plurality of linear actuators positioned symmetrically around and individually spaced along the outer edge of the propulsion element, a thrust chamber supporting the high-frequency actuator fixedly attached thereto, the thrust chamber surrounds the propulsion element while being spaced away from the outer edge thereof by a gap configured to direct gas from the second side to the first side of the propulsion element, wherein the thrust chamber is shaped to maintain the same gap throughout a reciprocal motion of the propulsion element within the thrust chamber, the thrust chamber is shaped to narrow and taper around the propulsion element at the second side thereof, and a gas directing cone-shaped cap mounted on the thrust chamber adjacent and outside the second side of the propulsion element, the gas directing cone-shaped cap is configured to direct gas around a periphery thereof and further around the second side and toward the first side of the propulsion element, wherein the thrust chamber and the gas directing cone-shaped cap are submerged in and surrounded by the gas surrounding the cone-shaped propulsion element, wherein the reciprocal motion of the propulsion element within the thrust chamber is done without altering the shape of the propulsion element, and wherein the reciprocal motion of the propulsion element forms a high gas pressure zone on the concave first side of the propulsion element and a low gas pressure zone on the convex second side thereof, thereby generating a gas pressure differential across the propulsion element and along the direction of propulsion thrust causing propulsion of gas away from the concave first side of the propulsion element and in a direction opposite the direction of propulsion thrust.

8. The gas propulsion thrust device, as in claim 7, wherein the magnetic levitation high-frequency linear actuator is configured with the plurality of permanent magnets mounted on the thrust chamber and the plurality of electromagnetic coils mounted on the propulsion element.

\* \* \* \* \*